US008838389B2

(12) United States Patent
Sinclair et al.

(10) Patent No.: US 8,838,389 B2
(45) Date of Patent: *Sep. 16, 2014

(54) POLAR DISPLAY FOR USE WITH DRILLING TOOLS

(75) Inventors: Paul L. Sinclair, Austin, TX (US); Thomas A. Springer, Austin, TX (US); Joseph K. Clontz, Austin, TX (US)

(73) Assignee: CBG Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/592,290

(22) Filed: Aug. 22, 2012

(65) Prior Publication Data
US 2013/0184995 A1    Jul. 18, 2013

Related U.S. Application Data

(63) Continuation-in-part of application No. 12/697,726, filed on Feb. 1, 2010, now abandoned, which is a continuation of application No. 11/756,504, filed on May 31, 2007, now Pat. No. 7,657,377, application No. 13/592,290, which is a continuation of application No. 13/400,561, filed on Feb. 20, 2012, which is a continuation of application No. 12/268,038, filed on Nov. 10, 2008, now Pat. No. 8,120,361.

(51) Int. Cl.
*G01V 99/00* (2009.01)
*G01V 11/00* (2006.01)

(52) U.S. Cl.
CPC ........... *G01V 99/00* (2013.01); *G01V 11/00* (2013.01)
USPC ........ 702/7; 702/9; 702/11; 702/13; 324/369; 324/366; 324/338; 324/343

(58) Field of Classification Search
None
See application file for complete search history.

(56) References Cited

U.S. PATENT DOCUMENTS

| 6,411,087 B1 * | 6/2002 | Fan et al. ............. 324/303 |
| 7,657,377 B2 * | 2/2010 | Sinclair et al. ........... 702/7 |
| 2010/0332137 A1 * | 12/2010 | Meadows et al. ......... 702/6 |

* cited by examiner

*Primary Examiner* — Jonathan C Teixeira Moffat
*Assistant Examiner* — Hien Vo
(74) *Attorney, Agent, or Firm* — Campbell Stephenson LLP

(57) ABSTRACT

Various techniques for generating a polar display include a method, which involves receiving information identifying a formation property of an anomaly within a geologic formation from a measurement-while-drilling (MWD) tool that includes several sensors. The formation property is identified by at least one magnitude and at least one distance. The formation property is also identified relative to a corresponding property of the geologic formation. The method also involves receiving information identifying an azimuthal angle from the MWD tool, where the azimuthal angle relates a position of the anomalous formation to a position of a first sensor. The method then generates a graphic, based upon the at least one magnitude and the at least one distance and the azimuthal angle, and displays the graphic on a polar display, in which a center of the polar display corresponds to a location of the borehole in which the MWD tool is located.

24 Claims, 14 Drawing Sheets

POLAR DISPLAY FOR USE WITH DRILLING TOOLS

CROSS-REFERENCE TO RELATED APPLICATIONS

This application is a continuation-in-part of U.S. patent application Ser. No. 12/697,726, entitled "Azimuthal Measurement-While-Drilling (MWD) Tool," filed Feb. 1, 2010 now abandoned, and naming Paul L. Sinclair and Thomas A. Springer as the inventors, which is in turn a continuation of U.S. patent application Ser. No. 11/756,504, entitled "Azimuthal Measurement-While-Drilling (MWD) Tool," filed May 31, 2007 and issued as U.S. Pat. No. 7,657,377, and naming Paul L. Sinclair and Thomas A. Springer as the inventors. This application is also a continuation of U.S. patent application Ser. No. 13/400,561, entitled "Azimuthally Sensitive Resistivity Logging Tool, filed Feb. 20, 2012, and naming Paul L. Sinclair and Joseph K. Clontz as the inventors, which is in turn a continuation of U.S. patent application Ser. No. 12/268,038, entitled "Azimuthally Sensitive Resistivity Logging Tool," filed Nov. 10, 2008 and issued as U.S. Pat. No. 8,120,361, and naming Paul L. Sinclair and Joseph K. Clontz as the inventors. These applications are assigned to CBG Corporation, the assignee of the present invention, and are hereby incorporated by reference in their entirety and for all purposes as if completely and fully set forth herein.

FIELD OF THE INVENTION

This invention relates to the field of logging while drilling, particularly as used in oil and gas development and exploration.

DESCRIPTION OF THE RELATED ART

Logging is a technique that is used to measure one or more characteristics, such as resistivity, of subsurface geologic formations. Such a measurement can be used, for example, to determine the type of subsurface formation surrounding a drill bit. Accordingly, logging provides useful information to engineers and geologists engaged in hydrocarbon exploration and production as well as similar fields, such as mining.

Logging can be performed by inducing a current to flow in a formation and then selectively measuring the current distribution. Several different techniques for performing logging have been developed. For example, open-hole logging involves in removing the drill pipe and bit from a wellbore and then lowering an open-hole logging tool into the wellbore to obtain the desired measurements.

Logging-while-drilling (LWD, also known as measurement-while-drilling (MWD)) systems have also been developed. These systems differ from open-hole logging in that measurements can be obtained while the drill pipe is in the wellbore. LWD systems permit log information, such as resistivity, to be measured in a formation very soon after the formation is penetrated by the drill bit. This provides substantially "real-time" information that (a) is obtained before the formation is substantially altered by inflow of drilling fluids or other factors and (b) may be used by the driller to control the drilling operation, for example by steering the bit so as to penetrate (or so as not to penetrate) a selected formation detected by the LWD system. LWD systems typically include transmitters and sensors disposed in or on sections of drill pipe that are located near the drill bit.

Some existing LWD systems have developed techniques to determine whether the drill bit is approaching an anomaly within a formation. However, these techniques generally lack the ability to pinpoint the location of the anomaly relative to the drill bit. Such techniques also lack the ability to distinguish between a more conductive anomaly on one side of the drill bit and a less conductive anomaly on the other side of the drill bit. In addition, existing techniques typically employ sensors that are responsive in only one rotational direction, requiring rotation of the entire drillstring to detect an anomaly, which may be inconvenient and time-consuming. Accordingly, improved techniques for use in LWD systems are desirable.

BRIEF DESCRIPTION OF THE DRAWINGS

A more complete understanding of the present invention may be acquired by referring to the following description and the accompanying drawings, in which like reference numbers indicate like features.

Figure 1:
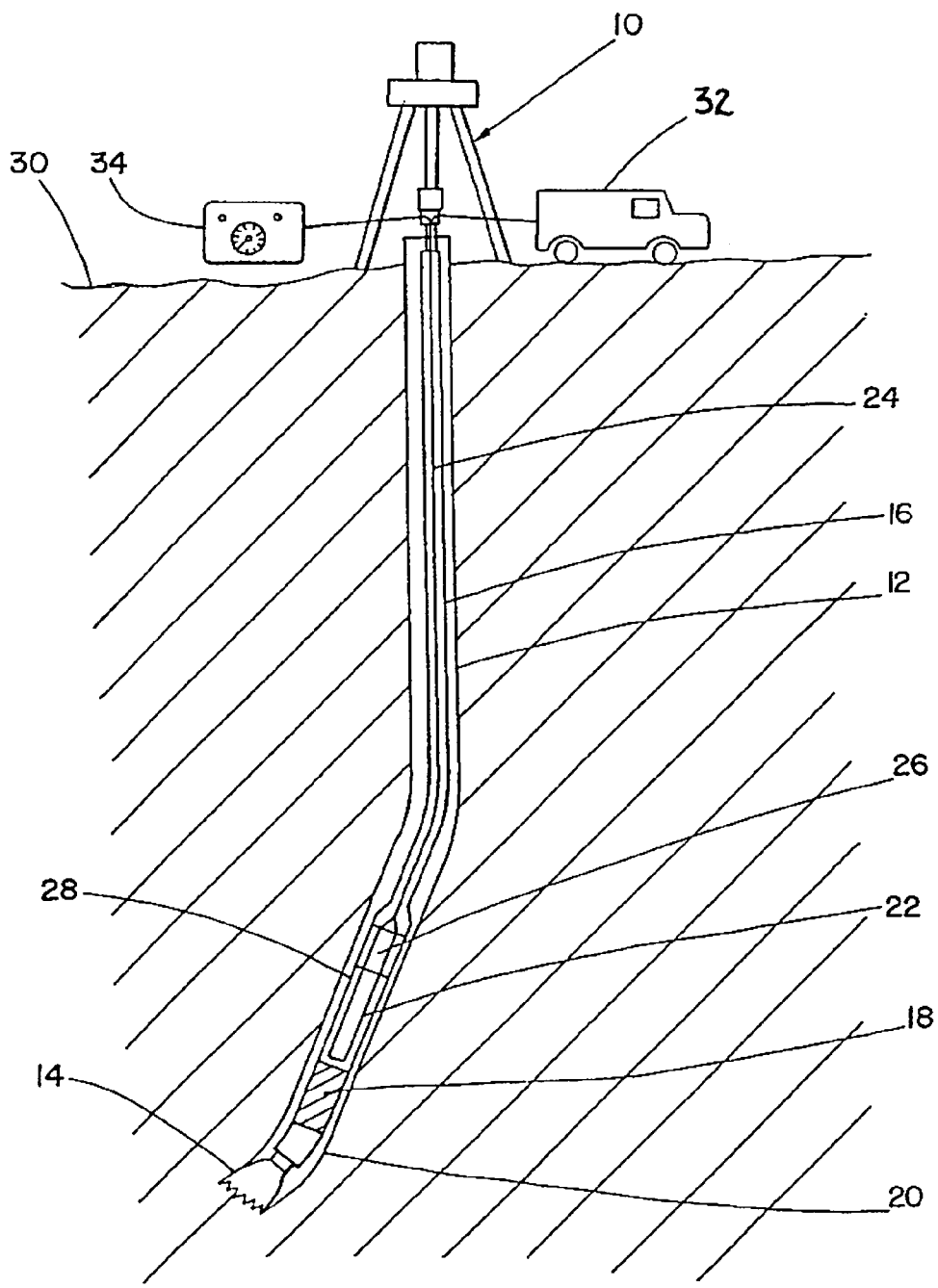
FIG. 1 illustrates a drilling system in which embodiments of the present invention can be employed.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a drilling operation employs drilling rig 10 to cut a borehole 12 into the earth, penetrating the subsurface geological formation. Drillstring 16 passes through borehole 12 and is coupled between drilling rig 10 and a drill bit 14. Drillstring 16 includes drill bit 14, drill collars 28, and drill pipe.

The lowest part of drillstring 16 is made up of drill collars 28. Drill collars 28 are heavy walled pipe that provide weight on drill bit 14 and strength to resist buckling under their own weight. The drill pipe is thinner walled. The drill pipe is kept in tension (which may be effected by collars 28 placing weight on drill bit 14) to prevent buckling. Drill collars 28 may have radial projections (not shown) called stabilizers. Short drill collars, which may be adapted for specialized functions, are called "subs," and references herein to drill collars are intended to include subs.

Drilling rig 10 turns drill bit 14, which cuts through the rock at the bottom of borehole 12. In some situations, drilling rig 10 turns drill bit 14 by attaching drill bit 14 to the lower end of drillstring 16 and turning drillstring 16 with powered equipment at the surface. Alternatively, as shown in FIG. 1, drill bit 14 may be driven by a motor 18, which is adjacent to drill bit 14 in borehole 12, through bent sub 20. The illustrated arrangement is known as a "steering tool" system, in which drillstring 16 does not need to rotate to turn the drill bit. However, drillstring 16 can be turned to steer drill bit 14, so as to control the direction of advance of borehole 12, thus permitting the route of borehole 12 to be precisely steered as desired through the subsurface geologic formation.

A logging-while-drilling (LWD) tool 22 is placed in drillstring 16, near drill bit 14 (if LWD tool 22 is used for geosteering, it may be desirable to locate LWD tool 22 as close as possible to drill bit 14). In a steered system, the LWD tool may be placed above mud motor 18, such that LWD tool 22 receives power and returns data to the surface through a wire line cable 24 that is passed down the center of a non-rotating (or slowly rotating) drillstring 16. In a system that uses a rotating drillstring 16 to turn drill bit 14, LWD tool 22 may be placed just above drill bit 14, and a mud pulse data telemetry system (or any other appropriate telemetry method) can be used to return information to the surface. Thus, LWD tool 22 is operatively positioned in borehole 12, typically with an annular space (e.g., filled with drilling mud) between tool 22 and the borehole wall.

LWD tool 22 can incorporate or be associated with directional sensors 26 that provide directional information to the driller to assist in controlling the steering of the drill bit. For example, such directional sensors can be calibrated to indicate the position of the LWD tool 22 relative to an absolute direction, such as the gravity vector or magnetic north.

In one embodiment, LWD tool 22 is configured to measure a reflected magnetic field. In this embodiment, LWD tool 22 also includes several receiving sensors, such as coils, that are each configured to measure a reflected magnetic field, as well as one or more transmitter coils that are configured to generate a magnetic field. In operation, LWD tool 22 generates a magnetic field, which is output by one or more transmitter coils. This magnetic field passes through the surrounding subsurface geologic formation and, if an anomalous formation is present, is reflected by that anomalous formation. The reflected magnetic field, if any, is detected by each of the receiving sensors included within LWD tool 22 (these sensors can, in at least some configurations, also detect the primary magnetic field induced by the transmitter coils). Since each sensor is located at a slightly different location, each sensor may detect a different magnitude of the magnetic field. The portion of the magnetic field that is received by each sensor is sensed and quantified by electronics within LWD tool 22. The magnitude of the detected magnetic field has an inverse relationship to the formation's resistivity in proximity to the receiving sensor. Thus, the quantified detected magnetic field can be converted to information that identifies the resistivity (or conductivity, which is simply the inverse of resistivity) of the proximate portion of the formation. Additionally, differences between the quantified reflected magnetic field, as seen at each of the different sensors, can be used to determine the azimuthal direction, relative to the position of the drill collar, to an anomalous formation. LWD tool 22 can also include or be coupled to telemetry or other communication equipment to transmit this information to the earth's surface.

In an alternative embodiment, LWD tool 22 can generate and measure an electrical survey current. This current passes through the surrounding subsurface geologic formation and is received by the electrical sensors included within LWD tool 22. The portion of the current that is received by each sensor is sensed and quantified by electronics within LWD tool 22. The amount of received current has an inverse relationship to the formation's resistivity in proximity to the receiving sensor. Thus, the quantified received current information can be converted to information that identifies the resistivity (or conductivity, which is simply the inverse of resistivity) of the proximate portion of the formation. LWD tool 22 can also include or be coupled to telemetry or other communication equipment to transmit this information to the earth's surface.

Above the earth's surface 30, telemetry receivers and/or other appropriate communication equipment can be located in a logging truck 32 located near drilling rig 10. Thus, communication equipment is positioned to receive and interpret the information generated by LWD tool 22 and directional sensors 26, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the directional progress of wellbore 12 as well as the formation properties of the geologic formation currently near LWD tool 22. In one embodiment, data display panel 34 can be part of a computing device (e.g., data display panel 34 can be rendered on the screen of a laptop computer used by an operator of drilling rig 10). Data display panel 34 can provide a polar display indicating formation properties of an anomaly within the geologic formation. For example, information identifying (or usable to identify) the resistivity (or another electrical characteristic) of such an anomaly can be provided by LWD tool 22. This information can be processed in order to render a polar display (or other graphical user interface) showing the orientation of and/or distance to the anomalous formation from the borehole (e.g., by showing the borehole in the center of a polar display and rendering a visual representation of the location of the anomalous formation relative to the borehole).

LWD Tool Using Reflected Magnetic Field

Figure 2A:
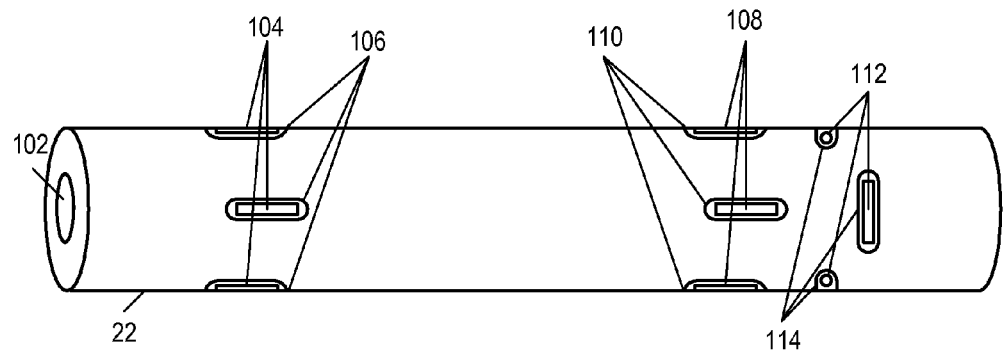
FIGS. 2A-2C illustrate example sensor arrangements on a logging-while-drilling (LWD) tool, according to various embodiments of the present invention.
Figure 2B:
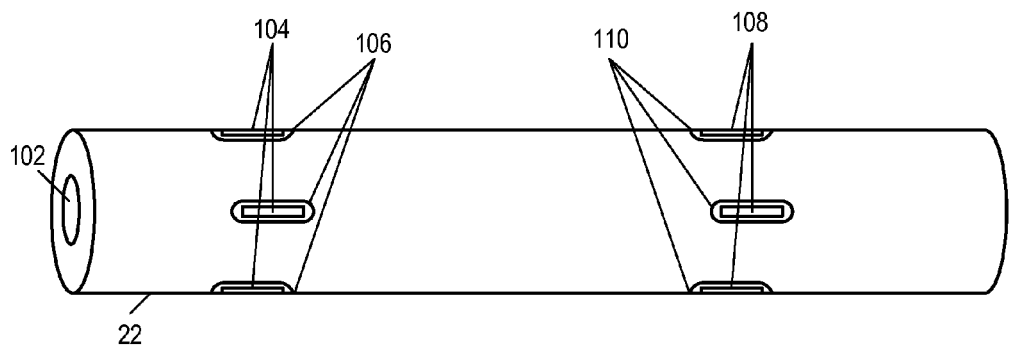
Figure 2C:
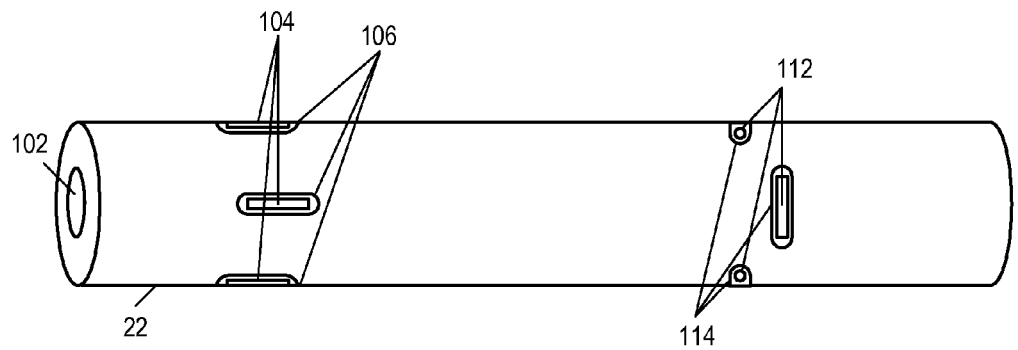

FIGS. 2A-2C illustrate example sensor arrangements for one embodiment of LWD tool 22. In each example, there are several transmitting coils, which can be used to induce a magnetic field in the surrounding formation, and several receiving sensors, which can each detect the induced magnetic field and/or a reflected magnetic field. Many other sensor configurations are possible in addition to those shown herein.

LWD tool 22 can be implemented as a sub (e.g., a drill collar) for use as part of a drillstring, as described above. In one embodiment, the structural features and physical components of LWD tool 22 are similar to those described in U.S. Pat. No. 6,064,210, which issued on May 16, 2000 and names Paul L. Sinclair as inventor, and which is hereby incorporated by reference as if completely and fully set forth herein.

The transmitter coils described herein are induction tools (e.g., inductors) that create an alternating magnetic field that propagates around and/or away from LWD tool 22. In some embodiment, such transmitter coils operate at a frequency in the range of 200 Kilohertz (KHz) to 2 Megahertz (MHz). A given embodiment may employ one or more transmitter coils configured to operate at a single frequency or multiple frequencies within this range.

In some embodiments, LWD tool 22 enables the transmitter coil by providing a sinusoidal current at a chosen frequency (e.g., within the range mentioned above) to the transmitter coil, which in turn causes the transmitter coil to generate the magnetic field. In many embodiments that employ multiple transmitter coils, the transmitter coils are operated in an interdependent manner (as opposed to being operated independently, where each transmitter coil receives an independently generated sinusoidal current, which may be done in alternative embodiments). Thus, the same sinusoidal current can be provided to more than one transmitter coil in at least some such embodiments.

The receiving sensors described herein can be implemented using any sensor that is capable of detecting the magnitude and/or phase of a magnetic field. In one embodiment, the receiving sensors are coils (e.g., inductors) made of insulated copper wire. Ferromagnetic material can be placed inside each coil (e.g., to provide enhanced effective cross-section area). In alternative embodiments, the receiving sensors are Hall-effect sensors. Other types of appropriate sensors may also be used.

FIG. 2A illustrates an axial view of a LWD tool having a sensor arrangement that includes four transmitter coils and two sets of receiving sensors, each containing four sensors. As shown, LWD tool 22 is implemented as a drill collar that includes a drilling mad channel 102 along the long axis of LWD tool 22 to allow drilling mud (a drilling fluid) to flow to the drill bit.

Four transmitter coils 104 are distributed around the circumference of the LWD tool, at a position that is closer to one end (shown towards the left hand side of FIG. 2C) of LWD tool 22. Due to the orientation of LWD tool 22 in this example, only three of the transmitter coils are visible. These transmitter coils 104 are located within the same plane, which forms a transverse (perpendicular to the long axis of LWD tool 22) cross section of LWD tool 22. Transmitter coils 104 are positioned such that the long axis of each transmitter coil is parallel to the long axis of LWD tool 22.

In this example, these transmitter coils are located within recesses 106 in the body of LWD tool 22. These recesses can be machined into the body of LWD tool 22. The recesses can be filled with non-conductive material. The transmitter coils can be insulated from each other, as well as from the receiver sensors.

Two sets of receiver sensors are distributed around the circumference of the other end (away from the transmitter coils) of LWD tool 22. The receiver sensors are configured to detect the magnetic field induced by the transmitter coils. Since the receiver sensors are detecting a magnetic field, there is no need for a physical electrical connection to couple the transmitter coils and receiver sensors.

In one embodiment, the receiver sensors are located approximately 2 meters from the transmitter coils. Each set of receiver sensors is located in a respective plane, each of which forms a transverse cross section of LWD tool 22. Receiver sensors 108 include four sensors (only three of which can be seen in the view of FIG. 2A) that are oriented such that their axis is parallel to the long axis of LWD tool 22 and the long axis of each of the transmitter coils. Receiver sensors 108 are located within recesses 110 in the body of LWD tool 22. Like the recesses that house the transmitter coils, recesses 110 can be filled with non-conductive material.

The second set of receiver sensors, receiver sensors 112, is also distributed around the circumference of LWD tool 22. Receiver sensors 112 are placed in a different transverse cross sectional plane of LWD tool 22 than receiver sensors 108. Receiver sensors 112 are oriented such that a long axis of each of receiver sensors 112 is perpendicular to the long axis of LWD tool 22, as well as to the long axis of each of receiver sensors 108 and the long axis of each of the transmitter coils 104. Receiver sensors 112 are located within recesses 114 in the body of LWD tool 22. Like the recesses that house the transmitter coils and receiver sensors 108, recesses 114 can be filled with non-conductive material.

Each of receiver sensors 108 and 112 is configured to operate independently. Accordingly, each receiver sensor can independently measure a magnetic field, such that each receiver sensor obtains a different measurement of the same magnetic field. Thus, the receiver sensors 108 and 112 can each be insulated from each other, as well as from transmitter coils 104.

Receiver sensors 108 and 112 are each configured to output an electrical signal indicative of the magnitude and/or phase of a detected magnetic field. In one embodiment, each of receiver sensors 108 and 112 is a receiver coil. The magnetic field induces a voltage in these coils. The magnitude and phase of this induced voltage in the receiver coils, relative to the current (which is used to enable the transmitter coils to generate the magnetic field) in transmitter coils 104, provides a measure of the electrical resistivity of the surrounding formation. The phase difference and/or amplitude ratio of the induced voltages in (or resistivity measured at) a pair of the receiver sensors can be used to determine the resistivity of the portion of the formation that lies between the two receiver sensors in the pair.

Figure 6:
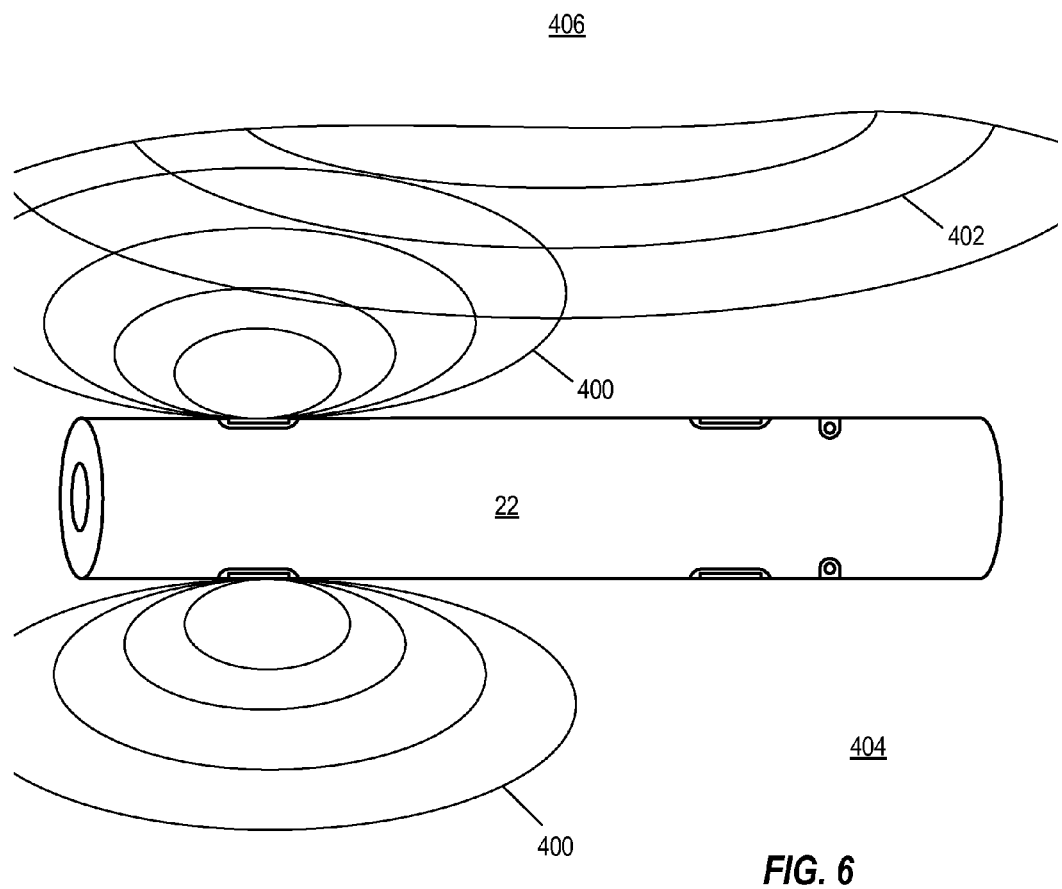
FIG. 6 illustrates the magnetic fields that can be induced and measured by one embodiment of a LWD tool.

The orientation of each receiver sensor's long axis, relative to the orientation of the transmitter coil(s), determines the portion of the magnetic field that the receiver sensor will be sensitive to, as will be explained in the context of FIG. 6. FIG. 6 illustrates an LWD tool 22 that is moving through a formation 404. An anomalous formation 406 is located at a distance from the LWD tool 22. LWD tool 22 induces a primary magnetic field 400 (for simplicity, only a representation of the magnetic component of this field is included) in the surrounding formation. Primary magnetic field 400 propagates in all directions with axial symmetry. The primary magnetic field is affected by surrounding formation 404, and thus the measurement of the primary magnetic field detected by the receiving sensors indicates the resistivity of the surrounding formation 404.

Since primary magnetic field 400 is an alternating field which propagates through the rock media, it is partially reflected by the boundary between media of differing resistivities. Accordingly, the primary magnetic field is reflected by the anomalous formation 406. The resulting reflected field 402 alters primary magnetic field 400, tilting the angle of the primary magnetic field's vector by an amount that is related to the relative strength of the reflection and the distance to the boundary between surrounding formation 404 and anomalous formation 406. The effect of the reflected magnetic field on the primary magnetic field is more pronounced closer to the boundary between the two formations, such that a receiver sensor closer to the boundary will respond to a stronger component of the reflected magnetic field than a receiver sensor further from the boundary.

The receiver sensors that are oriented in the same manner as the transmitter coils will be primarily sensitive to the primary magnetic field. These receiver sensors will also be sensitive to the reflected magnetic field. In particular, these receiver sensors (e.g., receiver sensors 108 of FIG. 2A) will detect the reflected magnetic field via its effect on the primary magnetic field.

The receiver sensors (e.g., receiver sensors 112 of FIG. 2A) that are oriented with their long axes perpendicular to the orientation of the transmitter coils are orthogonal to the primary magnetic field. Accordingly, these sensors will not respond to the primary magnetic field. However, these sensors will be sensitive to the reflected magnetic field. Accordingly, embodiments that include these sensors can provide an increased sensitivity to the reflected magnetic field, relative to the sensors that are configured to respond primarily to the primary magnetic field.

As LWD tool 22 moves through the borehole, LWD tool 22 can detect changes in the resistivity of the surrounding formation. Such changes in resistivity indicate that the surrounding formation is changing, since different types of geological formations have different resistivities. Thus, the presence of an anomalous formation within the surrounding formation will cause the detected resistivity to change as the drill bit nears the anomalous formation. The measured resistivity can be used to determine the type of geological formation surrounding the drill bit, as well as the type and/or location of anomalies within the surrounding geological formation, as will be discussed in more detail below.

FIG. 2B shows an alternative sensor arrangement. In this example, LWD tool 22 includes four sensors 108 that are oriented such that the long axis of each sensor 108 is parallel to the long axis of LWD tool 22 and each of the transmitter coils 106. Receiver sensors 108 are sensitive to both the primary and reflected (if any) magnetic fields.

FIG. 2C shows yet another alternative sensor arrangement. In this example, LWD tool 22 includes four sensors 108 that are oriented such that the long axis of each sensor 108 is perpendicular to the long axis of LWD tool 22 and each of the transmitter coils 106. In this example, the receiver sensors 108 are sensitive to the reflected magnetic field (if any) but not to the primary magnetic field.

The sensor arrangements of FIGS. 2A-2C allow each set of sensors 108 and/or 112 on LWD tool 22 to simultaneously obtain measurements of the relative magnitude and/or phase of a magnetic field at four distinct points that are evenly distributed around the circumference of the drill collar. Accordingly, the magnitude and/or phase of the magnetic field surrounding LWD tool 22 can be sensed in each of four directions simultaneously. This allows an operator (i.e., a person controlling the steering of a drill bit to which LWD tool 22 is coupled) to use LWD tool 22 to determine the location of anomalous formations, if any, that the drill bit may be approaching in any of those four directions, without rotating LWD tool 22. Reducing the need to rotate the LWD tool 22 can simplify and/or speed up the operation of LWD tool 22.

As noted above, many other sensor configurations are possible, in addition to those shown in FIGS. 2A-2C. For example, one alternative embodiment may employ only two receiver sensors (or two sets, each having two receiver sensors, where the axis of the sensors in one set is perpendicular to the axis of the sensors in the other set). When in use, an operator may rotate the LWD tool 180 degrees in between two sets of measurements at a given location, in order to obtain the same measurements that could be obtained simultaneously if four receiving sensors were used.

Other numbers of receiver sensors can also be included within each set, so long as each set includes at least two sensors. For example, some embodiments may include three sensors, while other embodiments include eight sensors.

As another example, instead of having each sensor within a given set of sensors (where each set contains sensors having substantially the same axis orientation, relative to the axis of the drill collar) in substantially the same cross-sectional plane of the drill collar, some sensors in a given set are located in a different cross-sectional plane than other sensors in the same set. Similarly, in some alternative embodiments, sensors from different sets may be arranged in substantially the same cross-sectional plane of the drill collar.

Another variation in sensor configuration can switch the location of the transmitter coils and one or both sets of receiver coils. Thus, some embodiments may place transmitter coils closer to the drill bit and receiver sensors towards the other end (furthest from the drill bit), while other embodiments place one or both sets of receiver sensors closer to the drill bit while placing the transmitter coils further from the drill bit. Similarly, in one embodiment, the transmitter coils may be located towards the middle of the drill collar, and one or more sets of receiver sensors may be located towards each end of the drill collar, such that the transmitter coils are between two sets of receiver sensors. Still another variation in sensor arrangement can orient the transmitter coils such that the long axis of the transmitter coils is perpendicular to the long axis of the LWD tool.

Figure 3:
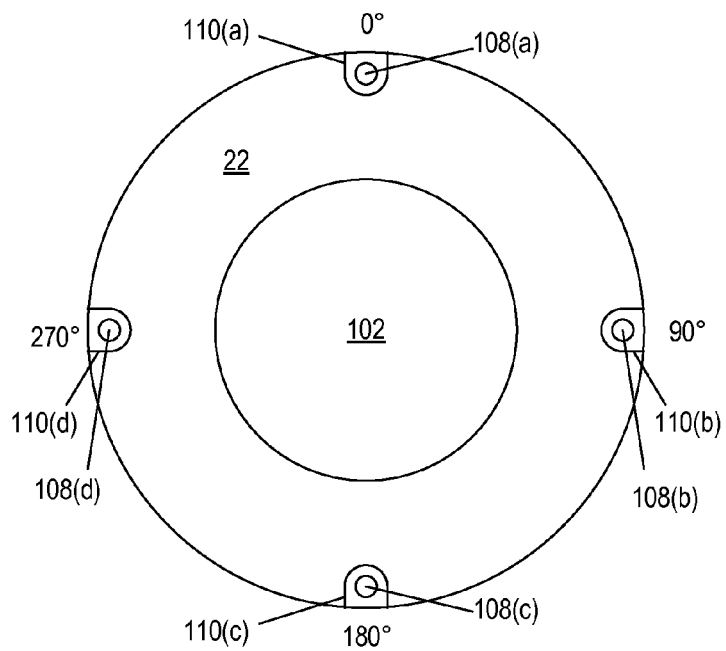
FIG. 3 is a cross-sectional view of the LWD tool, illustrating an example sensor arrangement, according to one embodiment of the present invention.

FIG. 3 illustrates a cross-sectional view of LWD tool 22. This view shows the drilling mud channel 102 passing through the middle of LWD tool 22. Four recesses, 110(*a*), 110(*b*), 110(*c*), and 110(*d*), extend into the body of LWD tool 22. These recesses are all located in the same cross-sectional plane. These recesses are spaced 90 degrees apart from each other around the circumference of LWD tool 22.

A receiver sensor (e.g., one of receiver sensors 108 of FIGS. 2A and 2C) has been inserted into each recess. In particular, receiver sensor 108(*a*) is located within recess 110(*a*), receiver sensor 108(*b*) is located within recess 110(*b*), receiver sensor 108(*c*) is located within recess 110(*c*), and receiver sensor 108(*d*) is located within recess 110(*d*). The receiver sensors are oriented such that the axis of each sensor is parallel to the axis of LWD tool 22.

A similar spacing and arrangement (now shown in FIG. 3) of sensors can be used to hold sensors (e.g., such as sensors 112 of FIGS. 2A and 2C) that are oriented such that the axis of each sensor is perpendicular to the axis of LWD tool 22. Thus, appropriate recesses to hold sensors oriented in that manner can be located in the same cross-sectional plane, spaced 90 degrees apart from each other.

Different embodiments can vary from the spacing described herein. For example, due to imprecision in measurement and/or machining tools, it is often impractical to attempt to obtain perfectly even spacing. Accordingly, most embodiments allow for some margin of error (e.g., 0.5%, 1%, or 5%, depending on the measurement and/or machining tools available and/or the desired accuracy of the resulting LWD tool) in the spacing and/or orientation of the transmitting coils and/or receiver sensors.

In some embodiments, even greater variations in spacing are used. Instead of having each sensor be arranged at a position that is spaced approximately 90 degrees from two other sensors, alternative embodiments may locate sensors around the circumference of the drill collar using a more varied spacing. For example, in one alternative embodiment, each sensor may be located closer than 90 degrees (e.g., 80 degrees) to one neighboring sensor and more than 90 degrees (e.g., 100 degrees) from the other neighboring sensor.

The position of each sensor can be mechanically keyed to a separate directional sensor or orientation sensor (e.g., a gyroscope). This allows the signal detected by each sensor to be analyzed as a component of a vector electromagnetic field, which has a direction referenced to the gravity vector and/or the direction of the magnetic north pole, or to an inertial reference vector.

Figure 4:
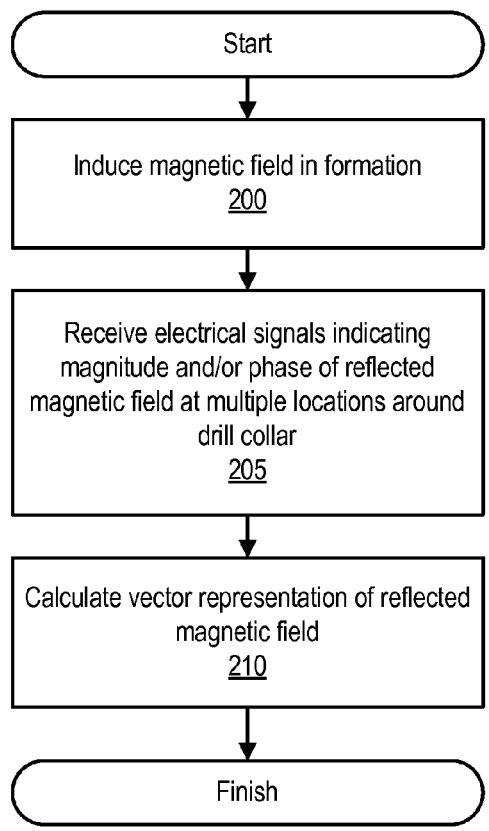
FIG. 4 is a flowchart of a method of operating the LWD tool, according to one embodiment of the present invention.

FIG. 4 is a flowchart of a method of using a LWD tool that has a sensor arrangement like one of those described above, in which more than one receiver sensor independently obtains a measurement of a magnetic field. This method can be performed by a LWD tool 22 as described in the figures above, in combination with components such as those shown in FIG. 5 (if such components are not integrated into LWD tool 22).

The method begins at 200, when a magnetic field is induced in a formation. As noted above, inducing a magnetic field can involve applying a sinusoidal current to one or more transmitter coils at a prespecified frequency. This operation can be performed by a current generator (e.g., an oscillator operating under the control of a control module, which can in turn be responsive to an operator's commands to take a measurement), operating in conjunction with one or more transmitter coils that are coupled to receive the sinusoidal current produced by the current generator.

At 205, electrical signals (e.g., a voltage induced in two or more receiver sensors) are received. The electrical signals indicate the magnitude and/or phase of a reflected magnetic field at multiple locations around the drill collar. In particular, each electrical signal indicates the magnitude and/or phase of a reflected magnetic field, as measured at a respective one of several locations along the circumference of the drill collar. These electrical signals are generated by two or more receiver sensors and received by components such as those shown in FIG. 5. As noted above, the magnitude and/or phase of the reflected magnetic field can be detected by measuring the reflected magnetic field directly (e.g., through the use of sensors that are oriented with their axes perpendicular to the orientation of the transmitter coil(s)' axes) or indirectly (e.g., through the use of sensors that are oriented with their axes parallel to the orientation of the transmitter coil(s)' axes, where such sensors measure the reflected magnetic field based upon its effect on the primary magnetic field).

At 210, a vector representation of the reflected magnetic field is calculated, based upon the electrical signals received at 205. This vector representation can be calculated by a control module (e.g., control module 302 of FIG. 5 below), which can be included within and/or coupled to the LWD tool.

This vector representation can then be displayed to an operator, logged, and/or used to generate a more sophisticated display (e.g., such as a polar display for geosteering applications). More details regarding the calculation of this vector representation are provided below. The vector representation indicates the location of (e.g., in terms of an azimuthal angle), distance to, and resistivity of the anomaly. The latter two components of the vector representative can be relative, such that the vector can represent multiple possibilities, including a less resistive anomaly closer to the LWD tool and a more resistive anomaly further from the LWD tool. Historical data about a formation can be used to select a more specific interpretation of the vector.

Figure 5:
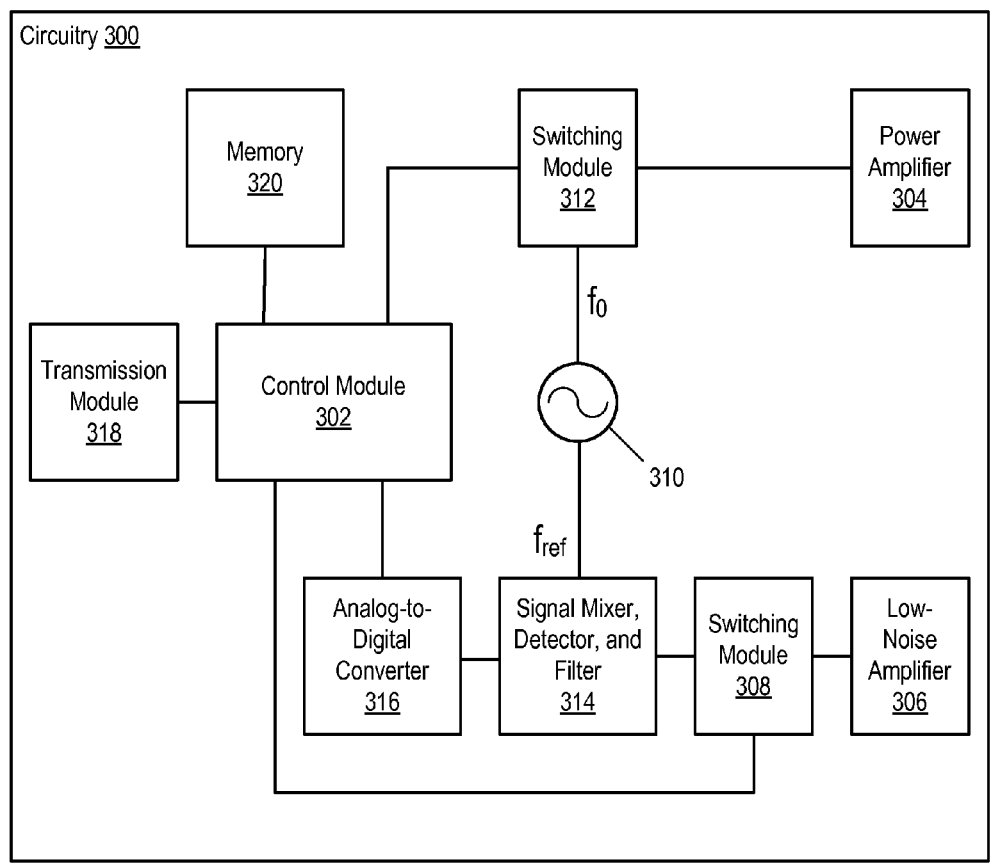
FIG. 5 is a block diagram of components that can be included within and/or coupled to the LWD tool, according to one embodiment of the present invention.

FIG. 5 is a block diagram of circuitry 300 that can be included within and/or coupled to LWD tool 22. Circuitry 300 includes a control module 302, a power amplifier 304, one or more low-noise amplifiers 306 (only one such low-noise amplifier is illustrated in FIG. 5; however, one such amplifier can be included for each receiver sensor), a switching module 308, a switching module 312, an oscillator 310, signal mixer, detector, and filter 314, analog-to-digital converter 316, and transmission module 318. Circuitry 300 can also include one or more memory devices such as memory 320.

Oscillator 310, switching module 310, and power amplifier 304 operate to enable one or more transmitter coils in order to induce a magnetic field in a formation surrounding the LWD tool. In particular, oscillator 310 (or any other appropriate current generator) generates a sinusoidal current (e.g., in the range of 100-400 KHz), which is then provided to power amplifier 304 via switching module 312. In this embodiment, control module 302 controls switching module 312 in order to select when the sinusoidal current is provided to power amplifier 304 (e.g., the current can only be provided when an operator is requesting that the magnetic field be induced in the surrounding formation for testing purposes). Power amplifier 304 amplifies the sinusoidal current, which is then provided to one or more transmitter coils (not shown) in the LWD tool.

The frequency of oscillator 310 can be selected based upon the desired responsiveness of the LWD tool. For example, in many situations, it is desirable to maximize the distance from the borehole at which the LWD tool is able to sense an anomalous formation, since this will give a driller early warning that he may soon encounter changed formation conditions. The radial depth of investigation is strongly influenced by the phenomenon of "skin depth," which is a characteristic distance that an alternating magnetic field can penetrate into a conductive medium. The skin depth is defined as the distance at which an electromagnetic field has experienced a phase-shift of 45 degrees and an attenuation of 1/e (−8.68 dB). Skin depth may be calculated as follows:

$$\text{Skin Depth}, \delta(\text{meters}) = (2/\omega \cdot \mu \sigma)^{1/2}$$

where $\omega$ is the angular frequency (radians/second), $\mu$ is the magnetic permeability of the medium (Henries/meter), and $\sigma$ is the conductivity of the medium (Siemens/meter).

Since the field must penetrate into the formation and be reflected back to be detected by the receiving sensors, the field effectively makes two trips, so the attenuation and phase-shift of the received signal will be doubled when the investigation distance equals the skin-depth. A practical limit for detection distance is when the attenuation reduces signal levels below the noise or accuracy limit of the measurement circuits attached to the receiving coils. To maximize the skin-depth in a given medium, one can choose to minimize the frequency since this is the only independent parameter. However, the magnitude of the signal induced in a receiving sensor is proportional to frequency, so a best compromise must be found in the tool design. Such a compromise can be found by using a frequency in the range of 100-400 KHz for embodiments in which the transmitter coils are spaced a few meters or so from the receiver sensors. At a frequency of 200 KHz, the skin depth ranges from 0.4 to 40 meters for a typical rock resistivity range of 0.1 to 1000 ohm-meters. Thus, the potential depth of investigation could be at least several meters in the higher resistivity range typical of most hydrocarbon-bearing reservoir rocks.

A voltage, which is dependent upon the magnetic field in the surrounding formation, can be induced in each receiver sensor. Each of the receiver sensors (not shown) is coupled to a respective low noise amplifier 306, which amplifies the signal induced in the respective receiver sensor and provides that amplified signal to switching module 308. Control module 302 controls switching module 308 (e.g., in order to select which receiver sensor's output is input to signal mixer, detector, and filter 314 at any given time).

The output of switching module 308 is provided to signal mixer, detector, and filter 314. Signal mixer, detector, and filter 314 also receive a reference signal ($f_{ref}$) (e.g., indicating the signal provided to the transmitter coils) from oscillator 310. Signal mixer, detector, and filter 314 can, among other things, remove unwanted noise from the amplified signal. For example, signal mixer, detector, and filter 314 can remove unwanted noise from image frequencies.

Signal mixer, detector, and filter 314 provides its output to analog-to-digital converter 316, which in turn outputs a digital representation of the signal received from signal mixer, detector, and filter 314 to control module 302. Control module 302 then processes this digital signal (in conjunction with other digital signals representing the signals detected at the other sensors included in the LWD tool) in order to produce a vector representation of the reflected magnetic field. In particular, control module 302 can obtain the magnitude and/or phase of the signal detected at each sensor, as well as positional information identifying the location of each sensor (e.g., relative to the gravity vector, magnetic North, or the axis of the LWD tool), in order to obtain a vector representation of the magnetic field. This vector representation can then be used to determine the resistivity and location (e.g., in terms of direction and distance) of an anomalous formation. Control module 302 can also process the received digital signals in order to identify the resistivity of the surrounding formation in the absence of any anomaly.

In one embodiment, the magnitude and phase of the induced voltage in a pair of receiver sensors (a pair includes two sensors in the same set, which includes sensors having the same orientation, that are spaced approximately 180 degrees apart from each other on the circumference of the LWD tool), relative to the current in the transmitter coil, is an accurate measure of the electrical resistivity of the rock in a selected location. Accordingly, the phase difference or the amplitude ratio between signals from a pair of closely-spaced receiver sensors (e.g., any two of the receiver sensors in a given set of similarly oriented receiver sensors) provides an accurate indication of rock resistivity in a narrow slice of rock between the sensors. Thus, control module 302 can calculate a value that is representative of the formation resistivity, based upon the signals received from the receiver sensors.

In particular, for a pair of sensors having axes parallel to the axis of the transmitter coil(s), the vector representation of the magnetic field can be calculated by calculating the ratio of the signals obtained by that pair of sensors. This representation also indicates the resistivity of the formation generally located in the axial region between the sensors. The signals received by these sensors, which are responsive to both the primary and reflected (if any) magnetic fields, can be used to calculate the resistivity of both a homogeneous geological formation and an anomalous geological formation (if any).

If instead the pair of sensors have axes that are perpendicular to the axis of the transmitter coil(s), so that the sensors are only sensitive to a reflected magnetic field, if any, the signals from these sensors can be used to determine the resistivity of an anomalous formation (e.g., by calculating the ratios of signals received by pairs of sensors).

If two sets of sensors, which are oriented perpendicular to each other, are included, the signals received from one set of sensors (e.g., those sensors sensitive to the primary field) can be used to calculate the resistivity of a homogeneous surrounding geological, while the signals received from the other set of sensors can be used to calculate the resistivity of the anomalous geological formation.

In general, when a receiver sensor is spaced apart from a transmitter coil, the voltage V induced in a receiving sensor due to a sinusoidal current I flowing in the transmitter coil is:

$$V(\text{volts}) = -j\omega M \cdot (1 - jkL) \cdot e^{jkL} \cdot I(\text{amperes})$$

where j is the imaginary operator $(-1)^{1/2}$, M is the mutual inductance between the transmitter and receiver (Henries), L is the spacing between the transmitter and receiver (meters), k is the complex propagation coefficient of the medium, $k = [j\omega\mu(\sigma + j\omega\in)]^{1/2}$, and $\in$ is the dielectric permittivity of the medium (Farads/meter).

Assuming that the dielectric permittivity of the medium has negligible effect on propagation, then the propagation coefficient reduces to the form:

$$k = (j\omega\mu\sigma)^{1/2}$$

$$k = (1+j)/\delta$$

Substituting this into Eq. 2 and re-arranging terms results in the simplified form:

$$V/I = -j\omega M \cdot [1 - (j-1)L/\delta] \cdot e^{(j-1)L/\delta}$$

In Eq. 5, V/I represents a transfer-function between coils, $j\omega M$ represents the low-frequency mutual coupling, $[1-(j-1)L/\delta]$ □ represents the spreading effect (since this example is focused on operating in the near-field region of the transmitter and receivers), and $e^{(j-1)L/\delta}$ represents the plane-wave propagation in the medium. $L/\delta$ is a dimensionless term, since it is a ratio between two physical distances.

Control module 302 can be configured to use Eq. 5 to predict the phase-shift and attenuation of the transfer-function in a medium of varying conductivity. Circuitry 300 can be configured to also use Eq. 5 to predict the reflected field from a rock-bed boundary (e.g., the boundary between a surrounding formation and an anomalous formation) in proximity to the LWD tool. If the boundary is parallel to the tool axis and at a distance of D meters, then the total distance from transmitter coil to the boundary and back to the receiver sensor is a matter of geometry:

$$\text{Total Distance } D' = 2[D^2 + (L/2)^2]^{1/2}$$

Substituting D' for L in Eq. 5 allows calculation of the reflected component of the signal, assuming that the reflection coefficient of the boundary is nearly −1, which is true if there is a large ratio (>10) between the conductivities of the two media on either side of the boundary. If we are only concerned with the phase of a received signal relative to the phase of the induced primary magnetic field, then the phase velocity of the field is constant in the medium regardless of distance, so the phase-shift may be simply represented as:

$$\text{Phase-shift } \Theta = \pi D'/4\delta$$

If the receiver sensor is oriented in a manner (e.g., such as shown in FIG. 2C) that is only responsive to a reflected signal from a boundary (i.e., and not to a signal in which the reflected signal is added to a direct signal, as shown in FIG. 2B) then it is easy to invert this equation to determine distance from the phase measured by that receiver sensor:

Distance to Boundary $D=[(2\Theta\delta/\pi)^2-(L/2)^2]^{1/2}$

The resistivity of the rock surrounding the tool can be determined from the simultaneous measurement with receiver sensors that are oriented in the same manner as the transmitter coils (e.g., as shown in FIG. 2B). For example, if all of those receiver sensors detect approximately the same resistivity value, then that value indicates the resistivity of the surrounding formation. If the sensors begin to detect different values, the most recent consistent (among those sensors) value can be used as the resistivity of the surrounding formation, and the difference among sensor outputs can be attributed to an anomalous formation that the LWD tool is approaching. A value indicating the resistivity of the surrounding formation (or a log of such values, and the time (and/or location) at which each value was obtained) can be stored in memory 320.

Control module 302 can use that resistivity of the surrounding formation to compute the skin-depth to be used in Eq. 8, and hence find the value of D. In some embodiments, an advanced 3-dimensional Finite-Element computer-modeling program such as FEMLAB™, available from Comsol, Inc. of Burlington, Mass., may be employed to simulate a wide range of formation conditions and to create a database, allowing control module 302 to perform inversion of measured phase-shift to actual boundary distance using the measured phase-shift and the database of simulated formation conditions. Such simulated results can be stored in memory 320 (e.g., in the form of a lookup table), allowing control module 302 to lookup a measured phase shift and obtain an appropriate distance to a boundary.

Thus, control module 302 can detect whether the LWD tool (and thus the drill bit to which the LWD tool is attached) is approaching or moving away from an anomaly. For example, as described above, control module 302 can compare the most recently calculated set of apparent resistivities detected by each sensor to historical resistivity values (e.g., generated by a computer-modeling program) stored in memory 320. If any of the resistivities have increased relative to the historical resistivities, control module 302 can determine that the LWD tool is approaching a more resistive anomaly. Similarly, if any of the detected resistivities have decreased relative to the historical resistivities, control module 302 can determine that the LWD tool is approaching a less resistive anomaly.

The output from a directional sensor included in and/or coupled to the LWD tool can then be used to determine the relationship between that known point and a standard directional vector, such as magnetic north or the gravity vector. The output from the directional sensor can thus be provided to control module 302, which can use this information to calculate a relative azimuthal angle describing the location of the anomaly relative to the standard directional vector.

More exact techniques can be used to calculate the azimuthal angle and distance to a resistivity anomaly using the configuration of the sensors. An example is described below with respect to FIG. 7.

Figure 7:
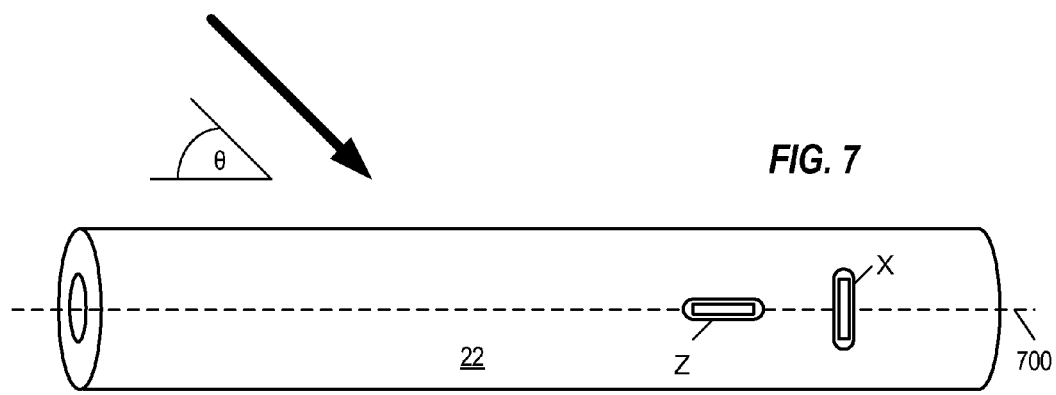
FIG. 7 illustrates how a vector representation of a reflected magnetic field can be calculated, according to one embodiment of the present invention.

FIG. 7 illustrates a vector representation of a reflected magnetic field (produced by, for example, a resistivity anomaly such as a rock-bed boundary between two rocks of contrasting resistivity) relative to a LWD tool 22. As shown, the LWD tool 22 includes a pair of sensors, labeled X and Z. Sensor X has a long axis that is perpendicular to the axis 700 of LWD tool 22 and a transmitter coil. Sensor Z has a long axis that is parallel to axis 700 of LWD tool 22 and the transmitter coil.

The magnetic field vector (shown as a bold arrow pointing towards LWD tool 22) approaches LWD tool at a relative angle 8 that is defined with respect to axis 700 of LWD tool 22. The magnetic field vector is normal to the surfaces of constant magnetic field strength, and indicates the general direction of a resistivity anomaly such as a bed-boundary that attenuates and reflects a magnetic field generated by a transmitter within LWD tool 22.

A voltage is induced in each of sensors X and Z by the magnetic field. The voltage induced in sensor X is $V_x$ and the voltage induced in sensor Z is $V_z$. These voltages can be used to calculate the relative angle $\theta$ as the arctangent of the ratio of $V_x$ to $V_z$, such that $\theta$=arctangent $(V_x/V_z)$. This angle represents the relative angle in the plane defined by the X and Z axis. This technique allows the relative angle to be detected, while also providing a robust LWD tool assembly since very little metal needs to be removed from the circumference of the collar to allow for insertion of the sensors.

If there is a similarly oriented sensor Y (not shown in FIG. 7), located 90° away from sensor X along the circumference of LWD tool 22 and having its long axis perpendicular to the Z sensor axis (and thus being oriented similar to sensor X), a second angle $\Phi$ can be calculated as the arctangent of the ratio of the voltage $V_y$ induced in sensor Y to $V_z$, such that $\Phi$=arctangent $(V_y/V_z)$. This angle represents the relative angle of the vector in a plane defined by the Y and Z axis.

The two angles together specify the direction of the magnetic field vector relative to axis 700 of LWD tool 22. In some embodiments, additional calculations can be applied to the calculated angles and/or during the calculation of these angles. For example, the voltages induced in the sensors can be scaled to account for differences in the gain of each of the sensors, and also to correct for the influence of the conductive drill collar of LWD tool 22, which can perturb the magnetic field detected by all or some of the sensors. The corrections can be derived from computer modeling of the performance of LWD tool 22 in various situations.

The two angles can be combined with the distance estimate described above to provide a complete vector representation, in terms of distance, magnitude, and angle, of the magnetic field. The magnitude $V_m$ of the magnetic field is equal to the square root of the sum of $V_x$ squared, $V_y$ squared, and $V_z$ squared. Again, certain scaling factors can be applied to the component voltages prior to calculating $V_m$, depending upon the particular configuration of the sensor coils being used.

Another more general solution of the measured voltages $V_x$, $V_y$, and $V_z$ in a polar coordinate system is more useful in some situations. We define an azimuthal angle (here, an angle of rotation around the Z axis relative to a fixed reference-point) as AZI, and an angle relative to the Z axis in any azimuthal direction (i.e., a relative bearing) as RB. Then AZI=arctangent $(V_y/V_x)$ and RB=arccosine $(V_z/V_m)$. With this solution, it is not necessary to rotate the drill-collar to obtain a complete solution of the direction of the magnetic vector.

Using the AZI angle and the Distance D as described previously, the data presentation method described below can be used to generate a polar display.

Returning to FIG. 5, transmission module 318 is configured to communicate information received and/or calculated by control module 302 to another sub or to a surface system. For example, transmission module 318 can receive information generated by control module 302 (e.g., by receiving the information directly from control module 302 or by retrieving such information from a storage device such as memory 320) that indicates the resistivity of the surrounding formation and transmit this information to a surface system. Alternatively, transmission module 318 can transmit information indicative of the magnitude and/or phase of the reflected electromagnetic field detected at each sensor to a surface system, allowing the surface system to calculate the resistivity of the surrounding formation from the data collected by LWD tool 22.

Transmission module 318 can also receive information sent to control module 302 by a surface system and/or another sub. For example, transmission module 318 can receive information indicating that a surface user would like LWD tool 22 to begin measuring the resistivity of the surrounding formation. Transmission module 318 can provide this information to control module 302 and/or store this information for subsequent access by control module 302. Transmission module 318 can be configured to interface to and/or communicate via a wire line cable (e.g., wire line cable 24 of FIG. 1), a telemetry system, or any other desired communication system and/or communication media.

In some embodiments, at least some of the components shown in FIG. 5 are included within the drill collar implementing LWD 22. For example, at least some of these components can be placed within one or more cavities within the drill collar. Alternatively, all or some of these components can be located within a cartridge that is configured to be coupled to or located within the drill collar (e.g., such a cartridge can be suspended within the drilling mud channel). In one embodiment, such a cartridge includes components such as electronic circuits, communication circuits, directional sensors (e.g., configured to detect a standard directional vector, such as the gravity vector or magnetic North), and the like. In some embodiments, this inner cartridge is retrievable, such that the inner cartridge can be installed and/or withdrawn from LWD tool 22 while LWD tool 22 is below the surface. For example, the inner cartridge can be installed or withdrawn through the drillstring using a slick line cable or wireline attached to the upper end of the LWD tool. The drillstring can include a muleshoe (not shown) to accept and orient the inner cartridge in such an embodiment.

While certain components are shown as part of the LWD tool in FIG. 5, it is noted that in alternative embodiments, such components can be implemented within other subs within the drillstring and/or other components within the drilling system. For example, the transmission module 318 and/or directional sensors (not shown) can each be implemented within another sub. Similarly, all or part of the functionality of control module 302 can be implemented within another sub or within a surface computing device (e.g., a laptop computer). For example, in one embodiment, a portion of control module 302 (e.g., the portion that calculates the vector representation of the electromagnetic field detected at each sensor) is implemented in software executing on a computer system located at the surface. Another portion of the control module 302 (e.g., the portion that controls the operation of oscillator 310, switching module 312, analog-to-digital converter 316, and transmission module 318) can be implemented in hardware, firmware, and/or software residing in LWD 22.

Alternatively, in some embodiments, an LWD tool may store and transmit only the digitized raw measurements from the sensors, for more detailed computations using a computer at a surface location, and thus the majority, or even all, of control module 302 may be implemented at such a surface computer. In still other embodiments, the LWD tool will be designed to process and transmit some of the data as described, but due to the limited data-rate of transmission available, the complete set of measured data will be stored (e.g., in Flash Memory) within the tool for later download to a surface computer when the borehole assembly is returned to the surface (e.g., during a bit run).

While specific equations have been described in the above description of FIG. 5, it is noted that other embodiments can implement different equations. For example, a LWD tool having six sensors will use different equations than those presented above, which are designed for use with a LWD tool having four sensors.

It is noted that all or some of the control module 302 shown in FIG. 5 can be implemented in software executing on a computing device (e.g., a personal computer, server, personal digital assistant, cell phone, laptop, workstation, or the like). In particular, such a computing device includes one or more processors (e.g., microprocessors, PLDs (Programmable Logic Devices), or ASICs (Application Specific Integrated Circuits)) configured to execute program instructions stored in a memory. Such a memory can include various types of RAM (Random Access Memory), ROM (Read Only Memory), Flash memory, and the like. The computing device can also include one or more interfaces (e.g., such as network interfaces, one or more interfaces to storage devices, and/or one or more interfaces to an input/output (I/O) device such as a keyboard, digital tablet, mouse, monitor, or the like), which can each be coupled (e.g., by a bus or other interconnect) to the processor(s) and memory.

It is noted that the program instructions and data (e.g., such as a history log and/or lookup table) consumed by and/or implementing all or part of control module 302 can be stored on various computer readable media such as memory 320. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

Figure 8A:
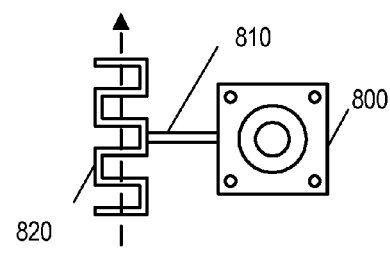
FIG. 8A illustrates a view of a LWD tool showing how the receiver sensor can be placed in the wall of the drill collar, according to one embodiment of the present invention.
Figure 8B:
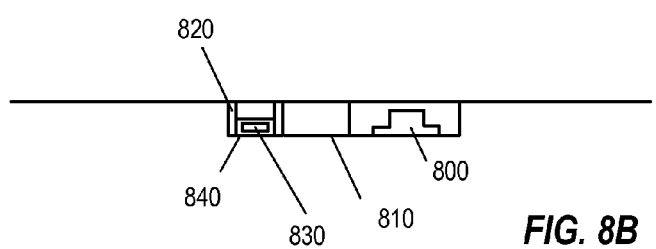
FIG. 8B illustrates another view of the LWD tool of FIG. 8A.

FIG. 8A illustrates how a sensor can be placed in the wall of a LWD tool 22. The view in FIG. 8A looks at the surface of the drill collar, and the long axis of the sensor is represented by the dashed arrow. FIG. 8B shows a cross-sectional view of the drill collar, when viewed in direction A-A marked on FIG. 8A. As shown in these figures, a meandering channel 820 has been formed in the drill collar. In addition, a cross-drilled hole 840 provides a location for a receiver sensor, as shown in cross-section in FIG. 8B, and the combination of the meandering channel 820 and the hole 840 operatively breaks the path of continuous metal around sensor 830. A wiring channel 810 connects this channel to an electrical connector 800, which can provide a voltage induced in a receiver sensor 830 disposed in a transverse hole 840 in the drill collar to other circuitry (e.g., circuitry 300 of FIG. 5) for further processing.

Meandering channel 820 and wiring channel 810 can be filled with non-conducting material, such as a composite epoxy/ceramic material or an elastomer which surrounds and protects a receiver sensor 830 in hole 840, and wires (in wiring channel 810) coupling the receiver sensor to electrical connector 800.

Using a meandering channel (as opposed to a non-meandering channel having the maximum width and length of the meandering channel) retains more of the metal of the drill collar. By retaining more of the metal in the drill collar, the drill collar's strength can be relatively less affected by the inclusion of the receiver sensor. Additional, the retained metal can provide increased protection to receiver sensor 830 from abrasions and impacts that occur during drilling. At the same time, the meandering channel ensures that there is no electrically conductive path around receiver sensor 830. If present, such an electrically conductive path could short-circuit receiver sensor 830.

FIGS. 8A and 8B show how a sensor having its long axis perpendicular to the axis of the drill collar can be protected by a meandering channel machined into the surface of the drill collar. A similar configuration, rotated 90° with respect to the orientation of the sensor axis shown in FIG. 8A, can be used to protect a sensor having its long axis parallel to the axis of the drill collar.

LWD Tool Using Measured Survey Current

Figure 9:
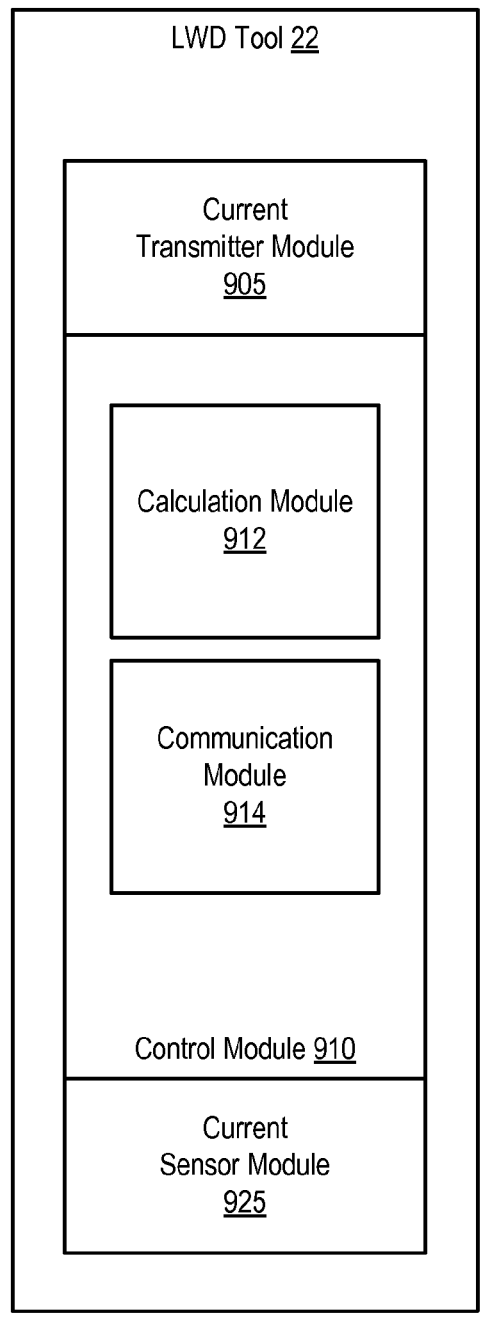
FIG. 9 is a block diagram illustrating the functionality included in a MWD tool, according to one embodiment of the present invention.

FIG. 9 is a block diagram of another embodiment of LWD tool 22. As shown, LWD tool 22 includes a current transmitter module 905, a control module 910, and a current sensor module 925. LWD tool 22 can be implemented as a sub (e.g., a drill collar) for use as part of a drillstring, as described above. In one embodiment, the structural features and physical components of LWD tool 22 are similar to those described in U.S. Pat. No. 6,064,210, which issued on May 16, 2000 and names Paul L. Sinclair as inventor, and which is hereby incorporated by reference as if completely and fully set forth herein.

Current transmitter module 905 is configured to cause a current to be injected into the subsurface geologic formation surrounding a borehole in which LWD tool 22 is inserted. In one embodiment, current transmitter module is electrically and/or mechanically coupled to one or more transmitters (not shown) on the outside of LWD tool 22 by one or more contacts (e.g., spring actuated contacts).

Current transmitter module 905 can include an oscillator (e.g., configured to produce a sinusoidal wave at a frequency in the range 100 Hz-10 KHz) as well as an associated power amplifier configured to boost the signal level of the output from the oscillator. In one embodiment, the oscillator is a digital sine wave synthesizer that also generates a synchronous square wave control signal for a phase sensitive detector included in current sensor module 925.

Current sensor module 925 is configured to quantify an amount of current received by (or another electrical characteristic detected at) each of several sensors disposed on the outside of the LWD tool Like current transmitter module 905, current sensor module 925 can be electrically and/or mechanically coupled to each of several sensors by a contact (e.g., a spring actuated contact). Current transmitter module 905 and current sensor module 925, as well as their respective sensors, transmitter(s), and contacts, can be electrically insulated from each other.

Current transmitter module 905 and/or current sensor module 925 can also include a sensor to detect a formation voltage. For example, in one embodiment, current transmitter module 905 includes an external sensor coupled to internal circuitry for determining the formation voltage. The voltage sensor can be a monitor electrode that is electrically insulated from the transmitter that injects current into the formation. Information representing the magnitude of the formation voltage can be provided to control module 910.

As noted above, current transmitter module 905 is configured to inject current into the formation surrounding LWD tool 22 via one or more transmitters. The return path of the current passes through the sensors coupled to current sensor module 925. Based upon the proportion of the amount of current injected by current transmitter module 905 relative to the amount of current received by each sensor coupled to current sensor module 925, a calculation module 912 within control module 910 can calculate various formation characteristics, as described in more detail below.

In the illustrated example, control module 910 includes calculation module 912 and communication module 914. Control module 910 is configured to receive information from current transmitter module 905 that indicates the amount of current injected into the surrounding formation. Control module 910 also receives information from current sensor module 925 that indicates the amount of current received by each of several sensors.

Based on the information received by control module 910, calculation module 912 can process the received information to calculate one or more values. In particular, based upon the information received from current sensor module 925, calculation module 912 can determine whether the drill bit is approaching an anomaly within the formation and, if so, calculate an azimuthal angle describing the location of the anomaly as well as a magnitude of a characteristic (e.g., conductivity or resistivity) of the anomaly and a distance to the anomaly. More details regarding the types of calculations that can be performed by calculation module 912 are provided below in the discussions of FIG. 10.

Communication module 914 is configured to communicate information received by control module 910 and/or calculated by calculation module 912 to another sub or to a surface system. Communication module 914 can be configured to interface to and/or communicate via a wire line cable (e.g., wire line cable 24 of FIG. 1), a telemetry system, or any other desired communication system and/or communication media.

In one embodiment, control module 910 (or a combination of control module 910 and current transmitter module 905 and/or current sensor module 925) is implemented as an inner cartridge that includes all of the active components of LWD tool 22, including electronic circuits, communication circuits, directional sensors, and the like. In some embodiments, this inner cartridge is retrievable, such that the inner cartridge can be installed and/or withdrawn from LWD tool 22 while LWD tool 22 is below the surface. For example, the inner cartridge can be installed or withdrawn through the drillstring using a slick line cable or wireline attached to the upper end of the LWD tool. The drillstring can include a muleshoe (not shown) to accept and orient the inner cartridge in such an embodiment.

While certain components are shown as part of LWD tool in FIG. 9, it is noted that in alternative embodiments, such components can be implemented within other subs within the drillstring and/or other components within the drilling system. For example, the communication module 914 and/or directional sensors (not shown) can each be implemented within another sub. Similarly, all or part of the functionality of control module 910 can be implemented within another sub or within a surface computing device.

Figure 9A:
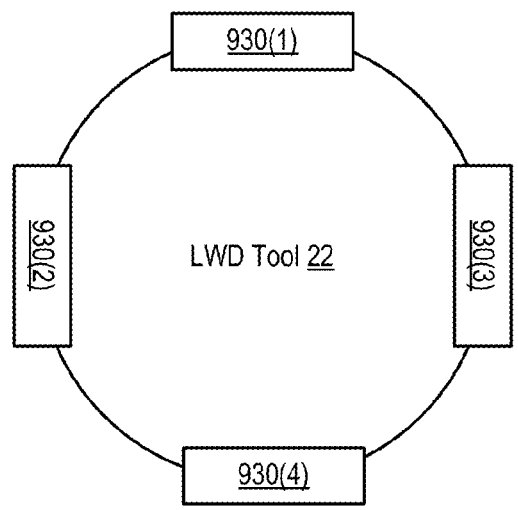
FIG. 9A is a cross-sectional view of the MWD tool, illustrating an example sensor arrangement, according to one embodiment of the present invention.

FIG. 9A illustrates a cross-sectional view of LWD tool 22 (e.g., this cross section can pass through the section of the LWD tool that includes current sensor module 925). This view illustrates how sensors 930(1)-930(4) can be disposed around the outside of LWD tool 22. These sensors can be electrically and/or mechanically coupled to a sensor module within the LWD tool. Sensors can include electrodes, magnetic elements, or any other suitable device for detecting a current flowing in (or other electrical characteristic of) a formation surrounding the LWD tool.

In the example of FIG. 9A, four sensors 930(1)-930(4) are used. These sensors are arranged in pairs, such that within a given pair, the sensors are directly opposite of each other. For example, sensor 930(2) is opposite sensor 930(3) (forming one pair of sensors), and sensor 930(1) is similarly opposite sensor 930(4) (forming another pair). Furthermore, the sensors are evenly spaced around the outside of LWD tool 22, such that the sensors are each located 90 degrees apart on the circumference of the LWD tool 22.

It is noted that other sensor arrangements can be used in other embodiments. For example, instead of having the sensors be evenly spaced, some sensors can be slightly closer to others (e.g., instead of having sensors at 0°, 90°, 180°, and 270°, sensors can be located at 0°, 95°, 180°, and 275°. Such an arrangement can still allow sensors within a given pair of sensors to be located directly opposite from each other, if desired.

As yet another alternative, some sensors may be located in different planes than other sensors. For example, while the example of FIG. 9A shows all sensors as being located in the same cross-sectional plane of the LWD tool, other embodiments can arrange sensors so that some sensors are located in a plane somewhat (e.g., a few millimeters) above or below (e.g., relative to the location of the end of the LWD tool closest to the drill bit) the other sensors.

Furthermore, it is noted that other embodiments can include differing numbers of sensors. For example, one alternative embodiment can include six sensors around the circumference of LWD tool 22. Another alternative embodiment can include eight sensors. These sensors can be evenly spaced around the periphery of LWD tool 22, or the spacing can be varied as described above.

Figure 9B:
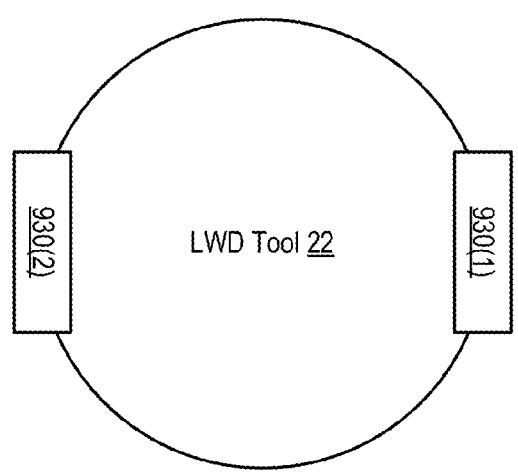
FIG. 9B is a cross-sectional view of the MWD tool, illustrating another sensor arrangement, according to one embodiment of the present invention.

FIG. 9B is another cross-sectional view of LWD tool 22 illustrating another sensor arrangement. In this arrangement, only two sensors 930(1) and 930(2) are disposed around the outside of LWD tool 22. In the illustrated example, the two sensors are located directly across from each other in the same plane. However, as described above, this arrangement can be varied (e.g., by placing the sensors in different planes or by moving one sensor so that the sensors are no longer exactly opposite each other).

In embodiments such as the one shown in FIG. 9B, the LWD tool 22 can be configured to take multiple measurements, and to be rotated between each measurement in a series of measurements. For example, in order to obtain equivalent measurements to a LWD tool having four pairs of sensors, the LWD tool shown in FIG. 9B can take four measurements. Between each measurement, the LWD tool is rotated by 90 degrees. To take the equivalent measurements to a LWD tool having two pairs of sensors, the LWD tool can take two measurements while being rotated 180 degrees between each measurement. Similarly, a LWD tool having three sensors can be rotated one or more times to take measurements equivalent to those generated by a LWD tool having six, nine, or more sensors. In general, depending upon the number "n" of measurements desired, the LWD tool can be rotated approximately 360/n degrees between each measurement.

In some embodiments, the LWD tool is configured to provide measurements at a fixed rate (e.g., one measurement every five minutes). In such embodiments, the LWD tool can be slowly rotated throughout the measurement process, such that the LWD tool is rotated the desired number of degrees between successive measurements. Thus, measurements can be taken while the LWD tool is slowly rotating (as opposed to being taken while the LWD is in a fixed, non-rotating position).

Figure 10:
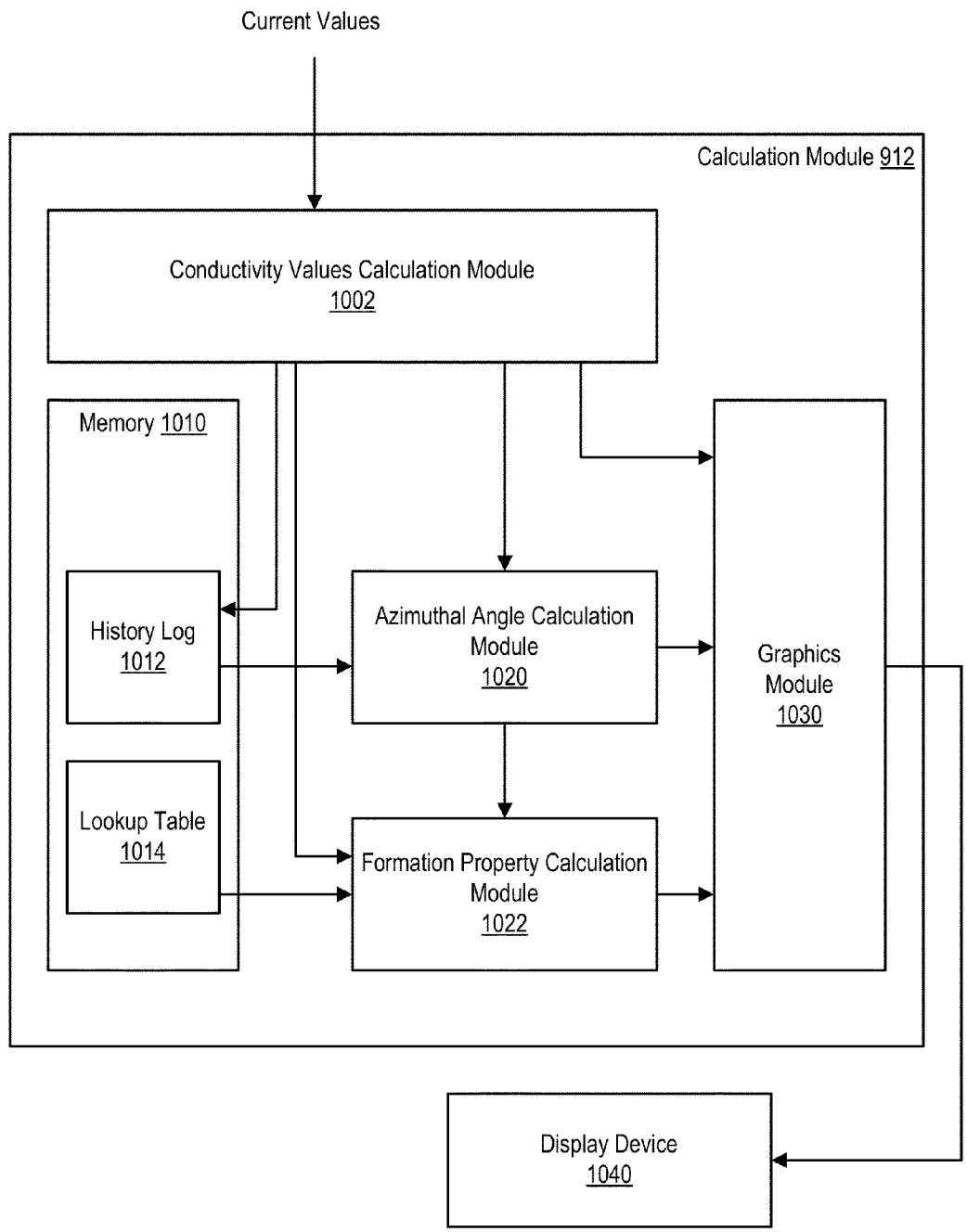
FIG. 10 is a block diagram of functionality included within and/or coupled to the MWD tool, according to one embodiment of the present invention.

FIG. 10 is a block diagram of functionality included within and/or coupled to the LWD tool. In particular, FIG. 10 illustrates an example of the functionality that can be included within a calculation module 912 of a LWD tool.

As shown, calculation module 912 includes conductivity values calculation module 1002, memory 1010, azimuthal angle calculation module 1020, formation property calculation module 1022, and graphics module 1030. Calculation module 912 is also coupled (e.g., via communication module 914 of FIG. 9) to a display device 1040. It is noted that display device 1040 is likely to be located on the surface, where display device 1040 can be viewed by an operator.

Conductivity values calculation module 1002 is configured to receive current values from current transmitter module 905 and/or current sensor module 925 of FIG. 9. These values represent the amount of current injected into the formation (as received from current transmitter module 905) and the amount of current returned to each of several sensors (as received from current sensor module 925). It is noted that in some embodiments, current transmitter module 905 always transmits the same amount of current, and thus a constant value representing that amount of current can be provided to conductivity values calculation module when the LWD tool is being configured, instead of having the current transmitter module dynamically provide such a value to calculation module 912 during operation.

Conductivity values calculation module 1002 can also receive one or more voltage values (not shown) that represent the formation voltage (e.g., the formation voltage can be the voltage detected between current transmitter module 905 and current sensor module 925). Such voltage value(s) can be received from current transmitter module 905 of FIG. 9

Conductivity values calculation module 1002 can be configured to correct the received current values in order to account for any errors introduced by the measurement process. For example, current values can be corrected for any offset errors. The offset errors, if any, can be detected and quantified by switching calibrated signals in the inputs of the measurement circuits. The voltage value, which represents the formation voltage, can similarly be corrected for any errors.

Once conductivity values calculation module 1002 has received and, if desired, corrected the received current and voltage values, conductivity values calculation module 1002 can calculate the individual apparent conductivity for each sensor, as well as a background conductivity. To calculate the individual apparent conductivity values, each individual current value is divided by the formation voltage value and multiplied by a tool constant.

For example, if there are four sensors in the LWD tool, calculation module 912 receives four individual current values $I_{A1}$, $I_{A2}$, $I_{A3}$, and $I_{A4}$, which represent the current received by respective sensors A1, A2, A3, and A4, from current sensor module 925. In this example configuration, which will be referred to throughout the discussion of FIG. 10, sensors A1 and A3 form one pair and sensors A2 and A4 form another pair. Sensors in the same pair are located substantially opposite from each other (e.g., similar to the arrangement shown in FIG. 9A). Conductivity values calculation module 302 can then process these values to obtain a set of four apparent conductivity values: $\sigma_{A1}$, $\sigma_{A2}$, $\sigma_{A3}$, and $\sigma_{A4}$. Each apparent conductivity value is related to a corresponding sensor (e.g., $\sigma_{A1}$ relates to sensor A1, $\sigma_{A2}$ relates to sensor A2, and so on). It is noted that conductivity values calculation module 1002 can alternatively (or additionally) calculate apparent resistivity values, which will simply be the inverse of the apparent conductivity values described herein.

Conductivity values calculation module 1002 then calculates the background conductivity, $\sigma_{AB}$. If all of the sensors are receiving substantially the same amount of current, conductivity values calculation module 1002 can calculate the background conductivity by averaging the apparent conductivity values. For example, in the situation in which there are four sensors, and thus four apparent conductivity values, the background conductivity can be calculated as:

$$\sigma_{AB} = \frac{\sigma_{A1} + \sigma_{A2} + \sigma_{A3} + \sigma_{A4}}{4}$$

If some of the sensors are receiving different amounts of current, it indicates that the drill bit may be approaching an anomaly. In this situation, conductivity values calculation module 1002 can use the most-recently calculated background conductivity as the current background conductivity, instead of calculating a new average.

After calculating the apparent conductivity values $\sigma_{A1}$-$\sigma_{AN}$ (where N is the number of sensors) and the background conductivity $\sigma_{AB}$, conductivity values calculation module 1002 can provide these values to one or more other modules within calculation module 912. For example, conductivity values calculation module 1002 can write these values to memory 1010 as part of history log 1012.

In general, at any given time, history log 1012 stores one or more sets of apparent conductivities (and/or resistivities) and/or one or more background conductivities (and/or resistivities) that have been previously calculated by conductivity values calculation module 1002. History log 1012 can be configured to store a maximum number of such sets of values (e.g., history log 1012 can be implemented as a circular queue, such that once history log 1012 is full, the newest entry to history log 1012 will be written over the oldest entry stored in history log 1012).

Conductivity values calculation module 1002 can also provide the apparent conductivity values to azimuthal angle calculation module 1020. Azimuthal angle calculation module 1020 is configured to calculate an azimuthal angle, $\theta_A$, from the apparent conductivity values. The azimuthal angle describes the location of an anomaly within a geographic formation (such an anomaly can be a parallel bed of rock that has different electrical characteristics than the rock formation currently being encountered by the drill bit) relative to a known point on the LWD tool. The azimuthal angle is used to define a vector that is perpendicular to the surface of the LWD tool and that describes the direction in which the anomaly is focused.

Azimuthal angle calculation module 1020 makes determinations as to whether (1) the apparent conductivities indicate that the LWD tool is approaching an anomaly within the formation and (2) if so, whether the anomaly is more or less conductive than the surrounding formation. Based on these determinations, azimuthal angle calculation module 1020 can then calculate the azimuthal angle $\theta_A$ that describes the location of the anomaly relative to a known point (e.g., a prespecified one of the sensors) on the LWD tool. Azimuthal angle calculation module 1020 is configured to calculate $\theta_A$ by computing the arctangent of the ratio of the differences between the apparent conductivities (or resistivities) detected at sensors in the same pair of sensors. As noted above, sensors within the same pair are typically located on substantially opposite sides of the LWD tool.

To determine whether the LWD tool (and thus the drill bet to which the LWD tool is attached) is approaching an anomaly, azimuthal angle calculation module 1020 can perform one or more comparisons. For example, azimuthal angle calculation module 320 can compare the individual apparent conductivity values. If the values differ from each other, it can be an indication that the formation is not uniform. Alternatively (or additionally), azimuthal angle calculation module 1020 can compare the most recently received set of apparent conductivities (or resistivities) to historical apparent conductivity values stored in history log 1012. If differences exist, it can indicate that the LWD tool is approaching an anomaly within the formation. If the apparent conductivities (or resistivities) indicate that no anomaly is present, azimuthal angle calculation module 1020 does not need to calculate the azimuthal angle.

If an anomaly is present, azimuthal angle calculation module 1020 then determines whether the anomaly is more or less conductive than the surrounding formation. This determination can be based on a comparison of the most recently received set of apparent conductivities with one or more historical conductivities stored in history log 1012. If any of the apparent conductivities have increased relative to the historical conductivities, azimuthal angle calculation module 1020 can determine that the LWD tool is approaching a more conductive anomaly. Similarly, if any of the apparent conductivities have decreased relative to the historical conductivities, azimuthal angle calculation module 1020 can determine that the LWD tool is approaching a less conductive anomaly. It is noted that similar determinations can be made using resistivity instead of conductivity.

As an alternative to using history log 1012, azimuthal angle calculation module 1020 can attempt to determine whether the anomaly is more or less conductive based solely on the relative amount of current currently being detected by each sensor. For example, in embodiments configured with four sensors A1-A4, azimuthal angle calculation module 1020 (or another module, such as conductivity values calculation module 1002) can identify the sensor $A_{min}$ that is receiving the least amount of current and the sensor $A_{max}$ that is receiving the greatest amount of current. If the anomaly is more conductive than the formation, then $A_{min}$ is the nearest sensor and $A_{max}$ is the furthest sensor, while if the anomaly is more resistive than the formation, $A_{max}$ is the furthest sensor and $A_{min}$ is the nearest sensor. An example of this situation is illustrated in FIG. 11.

Figure 11:
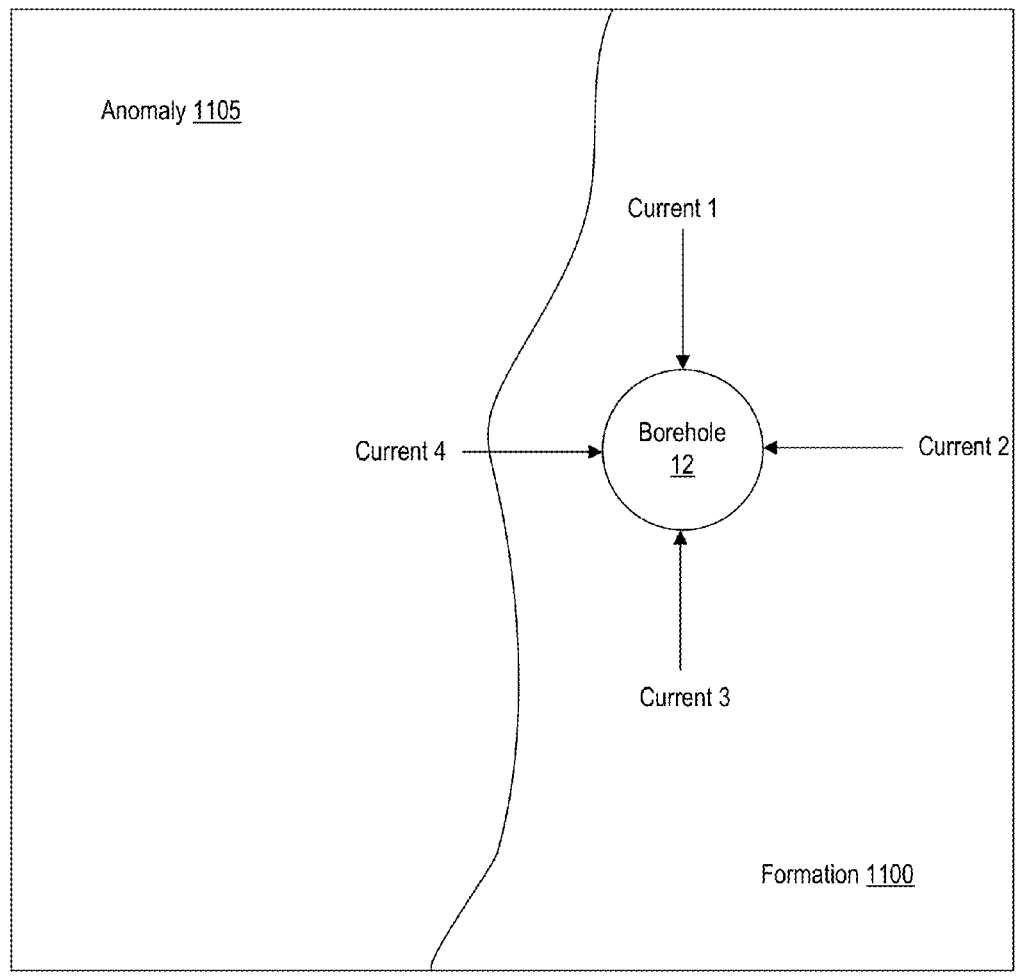
FIG. 11 is a cross-sectional view of the MWD tool passing through a formation containing an anomaly, according to one embodiment of the present invention.

FIG. 11 shows a cross-sectional view of the LWD tool passing through a formation containing an anomaly. In this example, borehole 12 (which contains the LWD tool) is passing through formation 1100. An anomaly 1105 within the formation is in close proximity to borehole 12 and has a boundary that is substantially parallel to the borehole axis.

In FIG. 11, the LWD tool is injecting current into formation 1100, and the returned current is detected at each of four sensors. As shown, one sensor detects current 1, a second sensor detects current 2, a third sensor detects current 3, and a fourth sensor detects current 4. If anomaly 1105 is more conductive than formation 1100, current 4 should be the greatest current (of currents 1-4), and current 2 should be the minimum current. If instead anomaly 1105 is less conductive than formation 1100, current 4 should be the smallest current (again, of currents 1-4), and current 1 should be the maximum current.

Returning to FIG. 10, once calculation module 912 has identified $A_{min}$ and $A_{max}$, the current values received at the other sensors (i.e., the sensors that are not $A_{min}$ nor $A_{max}$) can be averaged to produce an average current value $I_{avg}$. The ratios of the differences between the maximum and minimum currents and the average current can then be used to determine whether the anomaly is more or less conductive than the surrounding formation according to the following observation:

$$\frac{I_{max} - I_{avg}}{I_{avg} - I_{min}} \text{ (for conductive anomaly)} \gg$$

$$\frac{I_{max} - I_{avg}}{I_{avg} - I_{min}} \text{ (for resistive anomaly)}.$$

In other words, the sensor nearest a conductive anomaly receives a far greater percentage of the total current than does the sensor farthest from a resistive anomaly. Therefore, the conductive and resistive anomaly cases can be distinguished, based upon the magnitude of the ratio of the measured sensor currents. The particular range of magnitudes to assign to conductive or resistive anomalies can be determined by performing computer simulations of the particular LWD tool being used, and this range may vary among different LWD tools.

It is noted that in some situations, the current values may not provide enough information to definitely determine whether the anomaly is more or less conductive than the surrounding formation (e.g., if the anomaly is oriented directly between two sensors). In this situation, historical information, such as that stored in history log 1012, can be used to decide whether the anomaly is more or less conductive.

As noted briefly above, azimuthal angle calculation module 1020 can calculate the azimuthal angle $\theta_A$ by calculating the arctangent of the difference in resistivity or conductivity at each sensor of a pair of sensors (e.g., pair 1 includes sensors A1 and A3, and pair 2 includes sensors A2 and A4). In an embodiment in which the LWD tool has four sensors, azimuthal angle calculation module 1020 can calculate the azimuthal angle $\theta_A$ using the following formulas. If the anomaly is more conductive than the surrounding formation, the azimuthal angle can be computed from the apparent conductivity values, as shown in the following formula:

$$\theta_A = a\tan\left(\frac{\sigma_{A1} - \sigma_{A3}}{\sigma_{A2} - \sigma_{A4}}\right).$$

If instead the anomaly is more resistive than the surrounding formation, azimuthal angle calculation module 1020 can calculate the azimuthal angle using either the apparent resistivity values $\rho_{A1}$-$\rho_{A4}$ or the apparent conductivity values:

$$\theta_A = a\tan\left(\frac{\rho_{A1} - \rho_{A3}}{\rho_{A2} - \rho_{A4}}\right) = a\tan\left(\frac{\frac{1}{\sigma_{A1}} - \frac{1}{\sigma_{A3}}}{\frac{1}{\sigma_{A2}} - \frac{1}{\sigma_{A4}}}\right).$$

The azimuthal angle calculated by the above formulas is calculated relative to a known point (i.e., the azimuthal angle is not calculated relative to whichever sensor is currently closest to or furthest from the anomaly). Accordingly, the resulting azimuthal angle describes the location of the anomaly relative to a known point (e.g., the location of one of the sensors). For example, if the azimuthal angle is calculated relative to the position of sensor A1, an azimuthal angle of 0° indicates that the anomaly is located closest to sensor A1.

The output from a directional sensor included in and/or coupled to the LWD tool can then be used to determine the relationship between that known point and a standard directional vector, such as magnetic north or the gravity vector. The output from the directional sensor can thus be provided to azimuthal angle calculation module 1020, which can use his information then allows azimuthal angle calculation module to calculate a relative azimuthal angle describing the location of the anomaly relative to the standard directional vector. This relative azimuthal angle can be provided to graphics module 1030, as described in more detail below.

Formation property calculation module 1022 calculates the magnitude of the conductivity $\sigma_A$ of the anomaly. Together, the magnitude calculated by formation property calculation module 1022 and the angle calculated by azimuthal angle calculation module 1020 define a vector quantity. It is noted that instead of (or in addition to) calculating conductivity of the anomaly, formation property calculation module 1022 can calculate resistivity of the anomaly.

Formation property calculation module 1022 is configured to calculate the conductivity $\sigma_A$ based upon the ratio, $I_{near-to-far}$, of current received at the sensor nearest to the anomaly to current received at the sensor farthest from the anomaly. Formation property calculation module 1022 also uses the azimuthal angle $\theta_A$ calculated by azimuthal angle calculation module 1022, to obtain $\sigma_A$.

To be able to calculate $I_{near-to-far}$, formation property calculation module 1022 first identifies which of the sensors is nearest the anomaly. This sensor will be the near sensor, and the other sensor included in the same pair as the near sensor will be the far sensor. The azimuthal angle $\theta_A$, which (as described above) is directly computed from the apparent conductivities at each of the sensors by azimuthal angle calculation module 1020, can be used to identify which sensor is nearest the anomaly, since this angle is calculated relative to a fixed point on the LWD tool. Accordingly, formation property calculation module 1022 can receive information specifying azimuthal angle $\theta_A$ from azimuthal angle calculation module 1020 and use that information to identify the near and far sensors. If two of the sensors are equidistant from the anomaly (e.g., if $\theta_A$=45°, 135°, 225°, or 315°), either of the two closest sensors may be designated as the near sensor, and the corresponding opposite sensor can be designated as the far sensor.

Once the near and far sensors have been identified, formation property calculation module 1022 can calculate the ratio $I_{near-to-far}$ of current at the near sensor to current at the far sensor. The calculation uses the current values received by conductivity values calculation module 1002 (alternatively, conductivity values calculation module 1002 can calculate $I_{near-to-far}$ and provide $I_{near-to-far}$ to formation property calculation module 1022).

Formation property calculation module 1022 then uses the information in lookup table 1014 to calculate $\sigma_A$ and a distance between the anomaly and the borehole. In one embodiment, the information in lookup table 1014 is generated by simulating the LWD tool's response using a finite element computer model. For example, a three-dimensional finite element code model can be used to determine the response of a particular LWD tool to an anomaly that has a contrasting rock resistivity relative to the surrounding formation and that has a plane boundary parallel to the axis of the LWD tool. During modeling, the plane boundary is placed at different distances and azimuthal angles relative to the LWD tool. The resistivity (or conductivity) contrast between the anomaly and the surrounding formation is also altered. While these values are being varied, the voltages and currents associated with each sensor on the tool are computed. The results of the modeling correlate a particular azimuthal angle and $I_{near-to-far}$ with one or more resistivities (or conductivities) as well as one or more distances (here, each distance is the distance between the boundary of the anomaly and the borehole).

Accordingly, formation property calculation module 1022 can provide the azimuthal angle and near-to-far current ratio to lookup table 1014 and obtain one or more corresponding distances and one or more corresponding formation property (e.g., resistivity or conductivity) magnitudes. In one embodiment, each lookup will return one or more distance and magnitude pairs, as described in more detail below. In some situations, an exact match may not be found in lookup table 1014, and thus formation property calculation module 1022 may need to interpolate between the values in two adjacent entries of lookup table 1014. Alternatively, the information stored in lookup table 1014 can be represented by a set of mathematical functions, and formation property calculation module 1022 can use curve-fitting techniques to obtain the magnitude and distance values based upon those functions.

It is noted that due to ambiguities, several magnitude and distance pairs can correspond to the same near-to-far current ratio and azimuthal angle pair. For example, the same near-to-far current ratio and azimuthal angle pair can correspond to both a more conductive anomaly located further from the LWD tool and a less conductive anomaly located closer to the LWD tool. Absent additional information to determine which of these potential anomaly characteristic pairs is the correct characteristic pair, the LWD tool can simply provide all possible characteristic pairs and graphics module 1030 can display each possible characteristic of the anomaly to an operator.

As an example of how the information in lookup table 1014 can be calculated and used, in one embodiment, finite element simulations can be performed for three different azimuthal angles, eight different values of anomaly resistivity, and 12 different anomaly-to-borehole distances, resulting in a total of 288 simulation scenarios. The resulting information can be saved to lookup table 1014 as a sequence of 288 near-to-far current ratios, and these ratios can be arranged in three main groups. The first group of 96 values corresponds to simulations in which the azimuthal angle is 0°, the next 96 values correspond to simulations in which the azimuthal angle is 22.5°, and the final 96 values correspond to simulations in which the azimuthal angle is 45°. Each group of 96 values includes eight subgroups. Each subgroup corresponds to one of the eight resistivity values, and these subgroups can be arranged in increasing order of resistivity. The 12 values in each subgroup correspond to the 12 anomaly-to-borehole distances for which the simulations were performed, arranged in order of increasing distance.

To use this information, formation property calculation module 1022 first selects two of the three azimuthal angles for which the finite element model was solved. The two angles are selected such that the range bounded by the two angles contains the azimuthal angle calculated by azimuthal angle calculation module 1020. For example, if the azimuthal angle is 15°, formation property calculation module 1022 can select $\theta_1=0°$ and $\theta_2=22.5°$. Formation property calculation module 1022 can then obtain information identifying a set of distances and corresponding near-to-far current ratios for each of the selected angles from lookup table 1014.

Since the selected angles are not equal to the calculated azimuthal angle, formation property calculation module 1022 can then use interpolation to generate an interpolated set of distances and corresponding near-to-far current ratios, based upon the set of information obtained from lookup table 1014. For example, assume that lookup table 1014 indicates that for $\theta_1=0°$ and $\theta_2=22.5°$, the following distances correlate to the near-to-far current ratios listed in the same column, for an anomaly having a resistivity of 0.2 Ω-m:

| | distance | | | |
|---|---|---|---|---|
| | 0.0830 m | 0.1016 m | 0.1524 m | 0.2032 m |
| near-to-far ratio (0°) | 27.571788 | 5.836751 | 2.653185 | 1.975069 |
| near-to-far ratio (22.5°) | 22.758449 | 5.054004 | 2.437898 | 1.876372 |

Based upon this information, formation property calculation module 1022 can calculate an array of near-to-far current values versus distance for the measured azimuthal angle of 15° by interpolating between the corresponding points in the two arrays of finite element data corresponding to $\theta_1=0°$ and $\theta_2=22.5°$.

| | distance | | | |
|---|---|---|---|---|
| | 0.0830 m | 0.1016 m | 0.1524 m | 0.2032 m |
| near-to-far ratio (15°) | 24.362895 | 5.314919 | 2.509660 | 1.909271 |

Now, formation property calculation module 1022 can use the interpolated data along with the near-to-far current ratio to obtain an estimate of the distance to a 0.2 Ω-m anomaly. If an exact match for the calculated near-to-far current ratio is not present in the lookup table, formation property calculation module 1022 can select two values of the near-to-far ratio from the interpolated data, such that the selected values define a range that includes the measured near-to-far current ratio. For example, if the measured near-to-far current ratio is 3.0, formation property calculation module 1022 can select near-to-far ratio values 5.314919 and 2.509660, which correspond to distances of 0.1016 meters and 0.1524 meters, respectively. Interpolating between the corresponding distance values, formation property calculation module 1022 obtains a distance estimate of 0.143521 meters, or about 5.65". Accordingly, based on the information obtained from lookup table 1014, the near-to-far current ratio (3.0 in this example) and azimuthal angle measured by the LWD tool is consistent with a 0.2 Ω-m parallel bed at a distance of 5.65".

As mentioned above, multiple distance and magnitude pairs can correspond to the same near-to-far current ratio and azimuthal angle. Thus, formation property calculation module 1022 can repeat the process described above for one or more other anomaly resistivity values specified in lookup table 1014. Each magnitude and distance pair obtained by formation property calculation module 1022 can be provided to graphics module 1030.

Thus, as the above example shows, formation property calculation module 1022 can use information (such as the information stored in lookup table 1014 of FIG. 10) generated by modeling to identify one or more distances and one or more resistivities or conductivities (or other magnitudes of formation characteristics) of the anomaly, based upon the current ratio $I_{near-to-far}$ and azimuthal angle $\theta_A$. If needed, formation property calculation module 1022 can interpolate between known values to obtain these distances and magnitudes.

Graphics module 1030 is configured to receive values calculated by conductivity values calculation module 1002, azimuthal angle calculation module 1020, and formation property calculation module 1022. Based upon these values, graphics module 1030 is configured to generate information to be displayed to a user on display device 1040. In some embodiments, this information is primarily textual.

In other embodiments, graphics module 1030 is configured to generate one or more graphics that represent one or more of the quantities received from the other modules. For example, in one embodiment, graphics module 1030 is configured to generate a polar display that includes graphical content representing the anomaly that is being characterized by the values provided to graphics module 1030. The graphical content can be displayed upon a polar display, in which the center of the polar display corresponds to a location of a borehole in which the LWD tool is located.

In such an embodiment, graphics module 1030 can be configured to generate information defining one or more regions, each of which represents a possible position of the anomaly relative to the borehole and magnitude (in terms of conductivity, resistivity, or another formation characteristic) of the anomaly. The different regions can be distinguished by using different colors and/or shading patterns to fill and/or outline each region.

As noted above, lookup table 1014 can provide one or more magnitudes and distances to formation property calculation module 1022. A region can be generated for each magnitude and distance pair, and thus multiple regions can be displayed on the polar display. The number of regions to display will depend upon the distance between each region and the borehole and the resolution of the polar display.

In one embodiment, graphics module 1030 generates the boundary of each region by identifying a tangent line. The tangent line is calculated based upon the azimuthal angle and the distance component of the magnitude and distance pair to be represented by that region. The tangent line intersects a circle (centered at the center of the polar display) that has a radius equal to the distance component. This tangent line can then be used as the boundary of the region. Specific equations that graphics module 1030 can implement to generate the tangent line are described below with respect to FIG. 12, which illustrates graphical content that can be generated by graphics module 1030.

The magnitude component of the magnitude and distance pair to be represented by that region is used to determine how to shade that region. For example, a key or legend that correlates different conductivities or resistivities to particular color and/or shading schemes can be displayed as part of the graphic. Based upon the magnitude that corresponds to a particular region, graphics module 1030 can select the appropriate color and/or shading scheme and fill the region with the selected color and/or shading scheme.

While specific equations have been described in the above description of FIG. 10, it is noted that other embodiments can implement different equations. For example, a LWD tool having six sensors will use different equations than those presented above, which are designed for use with a LWD tool having four sensors. Similarly, in alternative embodiments, graphics module 1030 can use different equations to calculate the boundaries of the regions to be displayed.

While FIG. 10 shows a particular set of modules as being part of calculation module 912, it is noted that at least some of this functionality (e.g., such as the functionality implemented by graphics module 1030) can alternatively be implemented outside of the LWD tool. For example, in one alternative embodiment, calculation module 912 can include only conductivity values calculation module 1002, while a surface device (e.g., a surface computer system) can implement the other functionality shown in FIG. 10. In particular, the surface device can implement (e.g., in software executing on a computing device) azimuthal angle calculation module 1020, formation property calculation module 1022, graphics module 1030, history log 1012, and lookup table 1014. The LWD tool can communicate the conductivity values generated by conductivity values calculation module 1002 to the surface device, which can then operate as described above.

As another alternative, the LWD tool can calculate the individual apparent conductivity (or resistivity) values and provide the values to a surface device, which can then calculate background conductivity $\sigma_{AB}$, near-to-far current ratio $I_{near-to-far}$, azimuthal angle $\theta_A$, and anomaly conductivity $\sigma_A$ and distance.

As yet another alternative, the surface device can implement graphics module 1030 instead of calculation module 912. Thus, the LWD tool can provide the values generated by conductivity values calculation module 1002, azimuthal angle calculation module 1020, and formation property calculation module 1022 to the surface device, which can then input the values to graphics module 1030. Many other alternative implementations, which can subdivide the functionality shown in FIG. 10 between the LWD tool and a surface computing device in a variety of different ways, are also possible.

Polar Display

Figure 12:
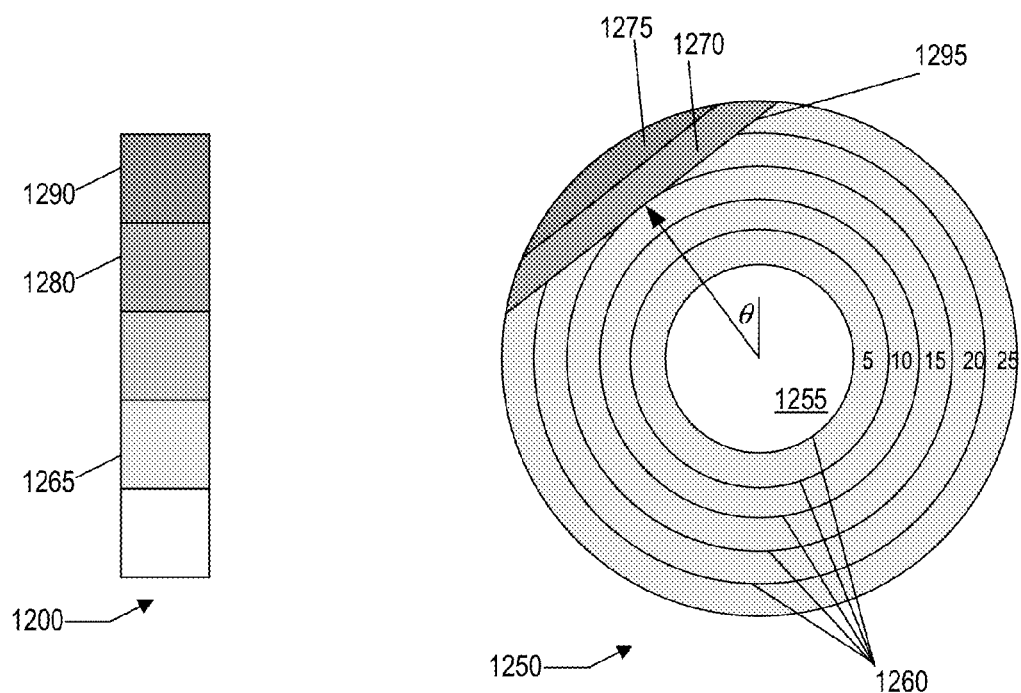
FIG. 12 is a block diagram of a polar display generated by and/or using information provided by the MWD tool, according to one embodiment of the present invention.

FIG. 12 is a block diagram of a polar display generated by and/or using information provided by the LWD tool (regardless of whether the LWD tool operates by measuring magnetic fields or currents). FIG. 12 illustrates how graphical content (e.g., as generated by graphics module 1030 of FIG. 10) can be displayed on a polar display 1250. In this example, various resistivity values are associated with different shades of grey, as shown in a key 1200. In key 1200, darker shades of grey (towards the top of the key) represent regions of increasing resistivity.

Polar display 1250 includes a center portion 1255, which represents the borehole. Polar display 1250 also includes several concentric rings 1260, which represent various distances, labeled 5, 10, 15, 20, and 25 (e.g., specifying distance in meters, feet, or inches), from the borehole.

The majority of the display is shaded with shade 1265. This pattern represents the resistivity of the formation through which the borehole is currently passing (e.g., this resistivity can be determined by taking the inverse of the background conductivity generated by conductivity values calculation module 1002 of FIG. 10).

Two regions 1270 and 1275 of different resistivity are also shown on the display. Region 1270 is shaded using shade 1280 and region 1275 is shaded using shade 1285. Each of these regions is shown as being located at a different radial distance from the center of the polar display. The angular direction of the regions indicates the direction of the anomaly relative to magnetic north (when drilling a substantially vertical well) or the gravity vector (when drilling a substantially horizontal well). Each region 1270 and 1275 can correspond to a magnitude and distance pair calculated by, for example, formation property calculation module 1022 of FIG. 10. Thus, both regions represent possible characteristics of the anomaly.

Based upon the polar display, an operator is able to determine the direction and proximity of an adjacent anomaly. As noted above, there may be several potential ways to characterize the anomaly (using multiple magnitude and distance pairs, as described above), since the LWD tool can respond in the same way to highly conductive bed at a greater distance as to a less conductive bed at close proximity. Thus, multiple possible characterizations of the anomaly can be displayed on the polar display, as indicated by the two regions displayed in FIG. 12.

In some embodiments, information about the anomalies already encountered by the borehole can be stored as part of the logging history. The graphics module can access this logging history and, in some situations, use the logging history to select fewer than all of the regions to display (e.g., if the logging history indicates that the anomaly has a particular resistivity, only the region having that resistivity needs to be displayed).

To generate regions such as 1270 and 1275 for display on a polar display, a graphics module (e.g., such as graphics module 1030 of FIG. 10) can calculate a tangent line. For a given region, the tangent line will identify the boundary of that region that is closest to the center of the polar display. Line 1295 is an example of a tangent line for region 1270.

The tangent line intercepts one of the concentric circles at a point having coordinates $x = -R \cdot \sin\theta$, $y = R \cdot \cos\theta$, where R is the distance associated with the region and $\theta$ is the relative azimuthal angle associated with the anomaly. The tangent line also intersects the y-axis of the polar display at a point where $x=0$, $y=R/\cos\theta$. Accordingly, the equation of the tangent line is:

$$y = \frac{R - x \cdot \sin\theta}{\cos\theta}.$$

Since only a portion of the tangent line will be displayed, the graphics module can truncate the tangent line, such that:

$$x^2 + y^2 \leq R^2.$$

Thus, a graphics module can calculate a tangent line that defines the boundary of a region corresponding to a particular possible characteristic (as defined by a magnitude distance pair) of an anomaly. If there is room on the display to show multiple such regions, additional tangent lines can be calculated and used to define the boundaries of the other regions.

Figure 13:
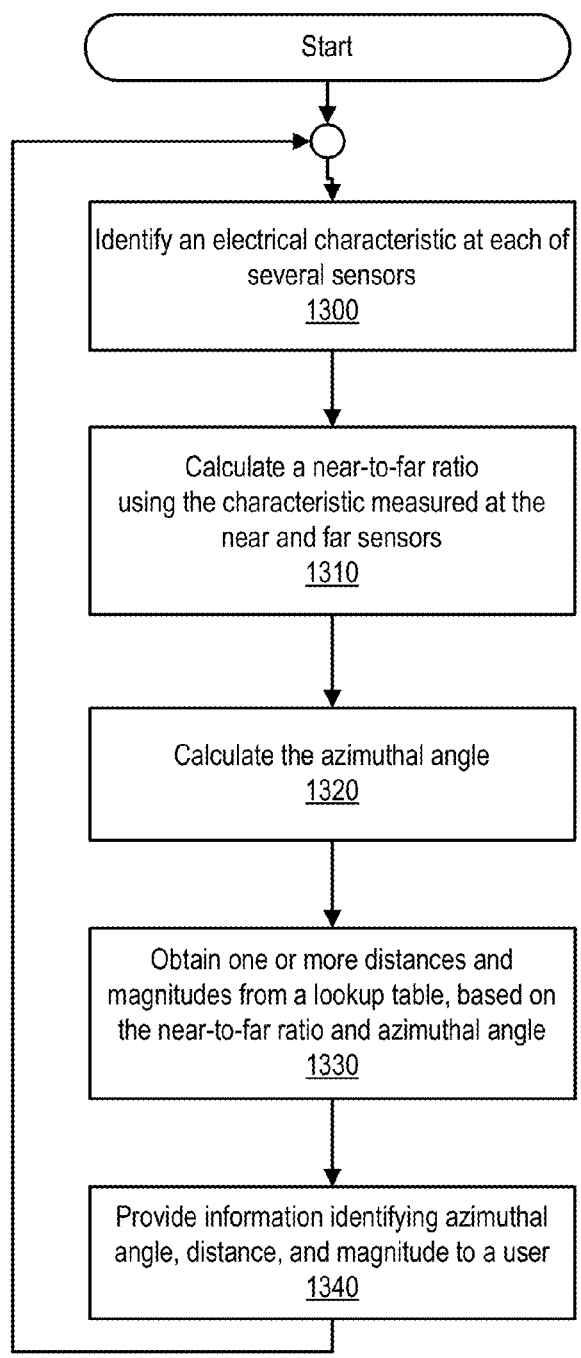
FIG. 13 is a flowchart of a method of calculating information describing a formation property, according to one embodiment of the present invention.

FIG. 13 is a flowchart of a method of calculating information describing a formation property. This method can be performed by a LWD tool and/or a surface computing device, as described above. In one embodiment, operation 1300 is performed by a LWD tool and operations 1310, 1320, 1330, and 1340 are performed by a surface computing device. In other embodiments, operations 1300, 1310, 1320, and 1330 are performed by a LWD tool and operation 1340 is performed by a surface computing device.

The method begins at 1300, when the LWD tool identifies an electrical characteristic (e.g., current and/or voltage) at each of several sensors included as part of the LWD tool. Based upon the identified characteristics, a near-to-far ratio is calculated, which indicates the ratio of the electrical characteristic detected at the sensor nearest to an anomaly relative to the electrical characteristic detected at the sensor furthest from the anomaly, as shown at 1310. Techniques for identifying the near and far sensors are described above in the description of FIG. 10.

At 1320, an azimuthal angle is calculated, based upon the electrical characteristics detected at the sensors. The azimuthal angle can be calculated, for example, by determining the apparent conductivity of a formation at each of the sensors, using the individual electrical characteristic identified by each of the sensors, and then using the apparent conductivities to calculate the azimuthal angle.

At 1330, one or more distances and magnitudes are obtained from a lookup table, based upon the near-to-far ratio and the azimuthal angle. Information identifying the azimuthal angle, distance, and magnitude can then be provided to a user, as shown at 1340. This information can be provided in the form of a graphical display.

Figure 14:
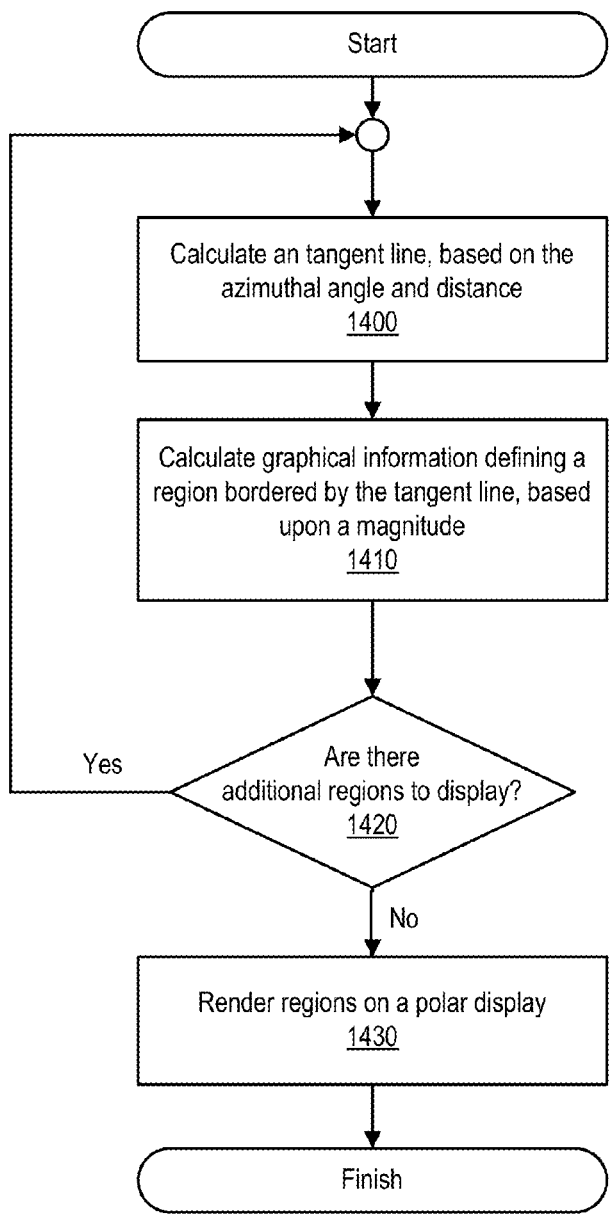
FIG. 14 is a flowchart of a method of generating a display, according to one embodiment of the present invention.

FIG. 14 is a flowchart of a method of generating such a display. This method can be performed by a graphics module (e.g., graphics module 1030 of FIG. 10). The method begins at 1400, when the graphics module calculates a tangent line, based upon the azimuthal angle and distance calculated in FIG. 13.

The graphics module then calculates graphical information defining a region that is bordered by the tangent line, as shown at 1410. This graphical information can be based upon the tangent line as well as the magnitude calculated in FIG. 13. The graphical information can include information specifying the location of the region on a polar display (e.g., such that the region is bounded by the tangent line) as well as a type of shading (e.g., in terms of color and/or pattern) with which to fill the region (e.g., the shading can indicate the magnitude of the electrical characteristic to which the region corresponds).

If there are more regions to be displayed, as determined at 1420, operations 1400 and 1410 can be repeated for each additional region. Once all of the graphical information for each region has been calculated, the regions are rendered on a polar display, as shown at 1430.

Figure 15:
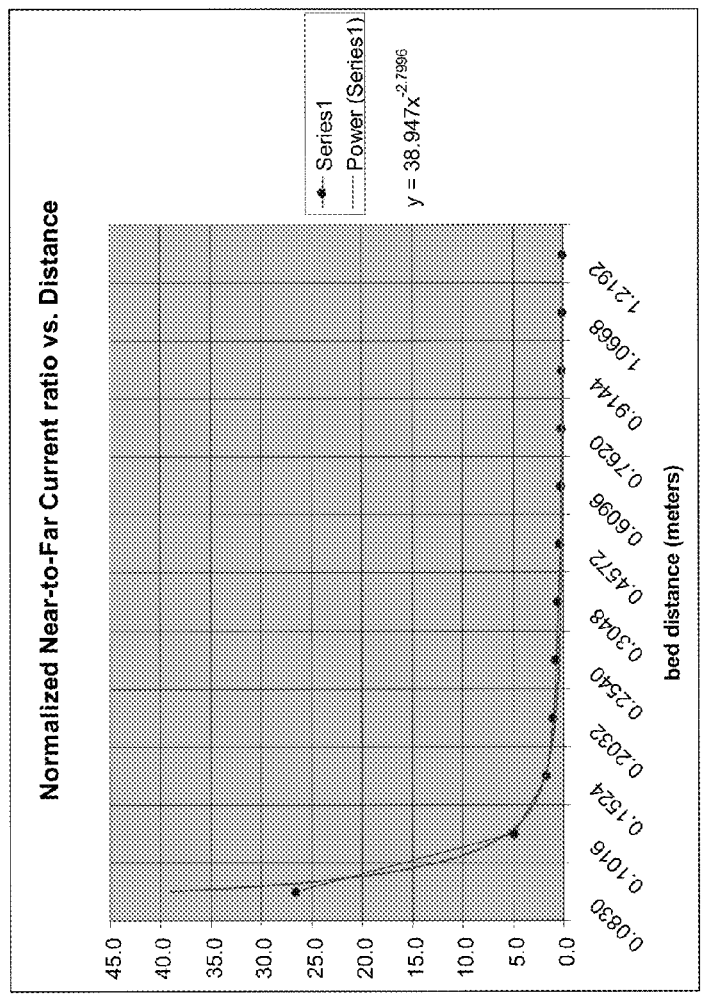
FIG. 15 is a graph that shows the relationship between the distance to the boundary of a parallel anomaly and the resistivity contrast detected by a MWD tool, according to one embodiment of the present invention.

FIG. 15 is a simplified graph that shows the relationship between the distance to the boundary of a parallel anomaly and the resistivity contrast detected by the LWD tool. It is noted that the data used to generate a graph can be obtained by performing a computer simulation of a model of the LWD tool, as noted above in the discussion of FIG. 10.

The graph of FIG. 15 suggests a simple inverse-square-law relation between a normalized current difference $I_{norm}$ (defined below) and the distance from the boundary. In FIG. 15, the normalized current ratio is plotted against the bed distance, along with a computed inverse-power-law curvefit, showing the close correlation between the two curves.

Finite element modeling of (or other simulation of) a LWD tool can predict the current distribution, as sensed by the LWD tool, that will arise from a given formation-anomaly combination, based on the specific geometric relationship and electrical characteristics of the formation and the anomaly. As discussed above, one type of anomaly is a parallel bed (a planar region parallel to the borehole), which can have a resistivity that is markedly higher or lower than that of the adjacent formation. As previously discussed, if the resistivity of a parallel bed is lower than that of the formation, then the sensor nearest the parallel bed will receive more current than the sensor on the opposite side of the LWD tool (i.e., the sensor farthest from the parallel bed). On the other hand, if the resistivity of the parallel bed is higher than that of the formation, the exact opposite holds, such that the nearest sensor receives less current than the sensor farthest from the bed.

Additionally, a further observation can be made regarding the relationship between the "normalized" near-to-far current ratio $I_{norm}$ and the distance to the parallel bed. The normalized near-to-far current ratio (for a conductive parallel bed) as follows:

$$I_{norm} = \frac{I_{near} - I_{far}}{I_{far}}.$$

As shown in FIG. 15, this ratio closely follows a simple inverse-power-law relationship as a function of the distance from the borehole to the conductive parallel bed. This can be seen in the graph, which plots $I_{norm}$ versus distance for a resistivity contrast of $\rho_{contrast} = 0.0002$, and typical of $\rho_{contrast} < 1.0$).

Returning to FIG. 10, it is noted that all or some of the modules 1012, 1002, 1020, 1022, and 1030 shown in FIG. 10 can be implemented in software executing on a computing device (e.g., a personal computer, server, personal digital assistant, cell phone, laptop, workstation, or the like). In particular, such a computing device includes one or more processors (e.g., microprocessors, PLDs (Programmable Logic Devices), or ASICs (Application Specific Integrated Circuits)) configured to execute program instructions stored in a memory (e.g., such as memory 1010 of FIG. 10). Such a memory can include various types of RAM (Random Access Memory), ROM (Read Only Memory), Flash memory, MEMS (Micro Electro-Mechanical Systems) memory, and the like. The computing device can also include one or more interfaces (e.g., such as network interfaces, one or more interfaces to storage devices, and/or one or more interfaces to an input/output (I/O) device such as a keyboard, digital tablet, mouse, monitor, or the like), which can each be coupled (e.g., by a bus or other interconnect) to the processor(s) and memory.

It is noted that the program instructions and data (e.g., such as history log 1012 and/or lookup table 1014) implementing all or part of calculation module 912 can be stored on various computer readable media such as memory 1010. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
    receiving, from a measurement-while-drilling (MWD) tool comprising a plurality of sensors, information identifying a formation property of an anomaly within a geologic formation,
        wherein the formation property is identified by at least one magnitude and at least one distance, and
        wherein the formation property is identified relative to a corresponding property of the geologic formation;
    receiving information identifying an azimuthal angle from the MWD tool,
        wherein the azimuthal angle relates a position of the anomalous formation to a position of a first sensor of the plurality of sensors;
    generating a graphic, based upon the at least one magnitude and the at least one distance and the azimuthal angle; and
    displaying the graphic on a polar display,
        wherein a center of the polar display corresponds to a location of the borehole in which the MWD tool is located,
        wherein the graphic shows a location of the anomalous formation having the formation property with the at least one magnitude at the at least one distance from the borehole,
        wherein the graphic comprises one or more regions,
        wherein each region represents a portion of the geologic formation having a different formation property, and
        wherein each of the regions corresponds to a respective one of one or more magnitude and distance pairs.

2. The method of claim 1, wherein each of the plurality of sensors is configured to detect one or more characteristics of a magnetic field.

3. The method of claim 1, wherein each of the plurality of sensors is configured to receive a current.

4. The method of claim 1, wherein the generating the graphic comprises:
    identifying a tangent line based upon the azimuthal angle, wherein the tangent line intersects a circle having a radius equal to a first distance of the at least one distance, and
    marking a first band on the polar display, wherein the first band is bounded by the tangent line.

5. A non-transitory computer readable medium comprising program instructions executable to:
    receive, from a measurement-while-drilling (MWD) tool comprising a plurality of sensors, information identifying a formation property of an anomaly within a geologic formation,
        wherein the formation property is identified by at least one magnitude and at least one distance, and
        wherein the formation property is identified relative to a corresponding property of the geologic formation;
    receive information identifying an azimuthal angle from the MWD tool,
        wherein the azimuthal angle relates a position of the anomalous formation to a position of a first sensor of the plurality of sensors;
    generate a graphic, based upon the at least one magnitude and the at least one distance and the azimuthal angle; and
    display the graphic on a polar display,
        wherein a center of the polar display corresponds to a location of the borehole in which the MWD tool is located,
        wherein the graphic shows a location of the anomalous formation having the formation property with the at least one magnitude at the at least one distance from the borehole,
        wherein the graphic comprises one or more regions,
        wherein each region represents a portion of the geologic formation having a different formation property, and
        wherein each of the regions corresponds to a respective one of one or more magnitude and distance pairs.

6. The non-transitory computer readable medium of claim 5, wherein each of the plurality of sensors is configured to detect one or more characteristics of a magnetic field.

7. The non-transitory computer readable medium of claim 5, wherein each of the plurality of sensors is configured to receive a current.

8. The non-transitory computer readable medium of claim 5, wherein generation of the graphic comprises:
    identification of a tangent line based upon the azimuthal angle, wherein the tangent line intersects a circle having a radius equal to a first distance of the at least one distance, and
    placement of a first band on the polar display, wherein the first band is bounded by the tangent line.

9. The system of claim 5, wherein generation of the graphic comprises:
    identification of a tangent line based upon the azimuthal angle, wherein the tangent line intersects a circle having a radius equal to a first distance of the at least one distance, and
    placement of a first band on the polar display, wherein the first band is bounded by the tangent line.

10. A system comprising:
a processor; and
memory, wherein the memory stores program instructions executable by the processor to:
   receive, from a measurement-while-drilling (MWD) tool comprising a plurality of sensors, information identifying a formation property of an anomaly within a geologic formation,
      wherein the formation property is identified by at least one magnitude and at least one distance, and
      wherein the formation property is identified relative to a corresponding property of the geologic formation;
   receive information identifying an azimuthal angle from the MWD tool,
      wherein the azimuthal angle relates a position of the anomalous formation to a position of a first sensor of the plurality of sensors;
   generate a graphic, based upon the at least one magnitude and the at least one distance and the azimuthal angle; and
   display the graphic on a polar display,
      wherein a center of the polar display corresponds to a location of the borehole in which the MWD tool is located,
      wherein the graphic shows a location of the anomalous formation having the formation property with the at least one magnitude at the at least one distance from the borehole,
      wherein the graphic comprises one or more regions,
      wherein each region represents a portion of the geologic formation having a different formation property, and
      wherein each of the regions corresponds to a respective one of one or more magnitude and distance pairs.

11. The system of claim 10, wherein each of the plurality of sensors is configured to detect one or more characteristics of a magnetic field.

12. The system of claim 10, wherein each of the plurality of sensors is configured to receive a current.

13. A method comprising:
receiving, from a measurement-while-drilling (MWD) tool comprising a plurality of sensors, information identifying a formation property of an anomaly within a geologic formation,
   wherein the formation property is identified by at least one magnitude and at least one distance, and
   wherein the formation property is identified relative to a corresponding property of the geologic formation;
receiving information identifying an azimuthal angle from the MWD tool,
   wherein the azimuthal angle relates a position of the anomalous formation to a position of a first sensor of the plurality of sensors;
generating a graphic, based upon the at least one magnitude and the at least one distance and the azimuthal angle, wherein the generating the graphic comprises: identifying a tangent line based upon the azimuthal angle, wherein the tangent line intersects a circle having a radius equal to a first distance of the at least one distance, and marking a first band on the polar display, wherein the first band is bounded by the tangent line; and
displaying the graphic on a polar display,
   wherein a center of the polar display corresponds to a location of the borehole in which the MWD tool is located, and
   wherein the graphic shows a location of the anomalous formation having the formation property with the at least one magnitude at the at least one distance from the borehole.

14. The method of claim 13,
wherein the graphic comprises one or more regions,
wherein each region represents a portion of the geologic formation having a different formation property, and
wherein each of the regions corresponds to a respective one of one or more magnitude and distance pairs.

15. The method of claim 13, wherein each of the plurality of sensors is configured to detect one or more characteristics of a magnetic field.

16. The method of claim 13, wherein each of the plurality of sensors is configured to receive a current.

17. A non-transitory computer readable medium comprising program instructions executable to:
receive, from a measurement-while-drilling (MWD) tool comprising a plurality of sensors, information identifying a formation property of an anomaly within a geologic formation,
   wherein the formation property is identified by at least one magnitude and at least one distance, and
   wherein the formation property is identified relative to a corresponding property of the geologic formation;
receive information identifying an azimuthal angle from the MWD tool,
   wherein the azimuthal angle relates a position of the anomalous formation to a position of a first sensor of the plurality of sensors;
generate a graphic, based upon the at least one magnitude and the at least one distance and the azimuthal angle, wherein generation of the graphic comprises: identification of a tangent line based upon the azimuthal angle, wherein the tangent line intersects a circle having a radius equal to a first distance of the at least one distance, and placement of a first band on the polar display, wherein the first band is bounded by the tangent line; and
display the graphic on a polar display,
   wherein a center of the polar display corresponds to a location of the borehole in which the MWD tool is located,
   wherein the graphic shows a location of the anomalous formation having the formation property with the at least one magnitude at the at least one distance from the borehole.

18. The non-transitory computer readable medium of claim 17,
wherein the graphic comprises one or more regions,
wherein each region represents a portion of the geologic formation having a different formation property, and
wherein each of the regions corresponds to a respective one of one or more magnitude and distance pairs.

19. The non-transitory computer readable medium of claim 17, wherein each of the plurality of sensors is configured to detect one or more characteristics of a magnetic field.

20. The non-transitory computer readable medium of claim 17, wherein each of the plurality of sensors is configured to receive a current.

21. A system comprising:
a processor; and
memory, wherein the memory stores program instructions executable by the processor to:
   receive, from a measurement-while-drilling (MWD) tool comprising a plurality of sensors, information identifying a formation property of an anomaly within a geologic formation, wherein the formation property is identified by at least one magnitude and at least one distance, and wherein the formation property is identified relative to a corresponding property of the geologic formation;

receive information identifying an azimuthal angle from the MWD tool, wherein the azimuthal angle relates a position of the anomalous formation to a position of a first sensor of the plurality of sensors;

generate a graphic, based upon the at least one magnitude and the at least one distance and the azimuthal angle, wherein generation of the graphic comprises: identification of a tangent line based upon the azimuthal angle, wherein the tangent line intersects a circle having a radius equal to a first distance of the at least one distance, and placement of a first band on the polar display, wherein the first band is bounded by the tangent line; and display the graphic on a polar display, wherein a center of the polar display corresponds to a location of the borehole in which the MWD tool is located, and wherein the graphic shows a location of the anomalous formation having the formation property with the at least one magnitude at the at least one distance from the borehole.

22. The system of claim 21, wherein the graphic comprises one or more regions, wherein each region represents a portion of the geologic formation having a different formation property, and wherein each of the regions corresponds to a respective one of one or more magnitude and distance pairs.

23. The system of claim 21, wherein each of the plurality of sensors is configured to detect one or more characteristics of a magnetic field.

24. The system of claim 21, wherein each of the plurality of sensors is configured to receive a current.

* * * * *